US012668331B2

(12) United States Patent
Cyr Mercier et al.

(10) Patent No.: US 12,668,331 B2
(45) Date of Patent: Jun. 30, 2026

(54) UNDERWATER RETRIEVAL DEVICE AND REWINDING SYSTEMS

(71) Applicant: DEVOCEAN INC., Quebec (CA)

(72) Inventors: Carl-Philippe Cyr Mercier, Rimouski (CA); Simon Therrien, Sherbrooke (CA); Francois Gauthier, Sherbrooke (CA); Renaud Dupont, Granby (CA); Louis-Philippe Baillargeon, Sherbrooke (CA); Olivier Grenier, Sherbrooke (CA); Alice Cordon, Sherbrooke (CA); Thomas Paris, Portneuf (CA); Olivier Piche, Pont-Rouge (CA); Jeremy Delorme, Sherbrooke (CA)

(73) Assignee: DEVOCEAN INC., Quebec (CA)

( * ) Notice: Subject to any disclaimer, the term of this patent is extended or adjusted under 35 U.S.C. 154(b) by 340 days.

(21) Appl. No.: 18/688,929

(22) PCT Filed: Jan. 5, 2023

(86) PCT No.: PCT/CA2023/050005
§ 371 (c)(1),
(2) Date: Mar. 4, 2024

(87) PCT Pub. No.: WO2023/130183
PCT Pub. Date: Jul. 13, 2023

(65) Prior Publication Data
US 2024/0367755 A1     Nov. 7, 2024

Related U.S. Application Data

(60) Provisional application No. 63/266,499, filed on Jan. 6, 2022.

(51) Int. Cl.
| | | |
|---|---|---|
| *B63B 22/06* | (2006.01) | |
| *B63B 22/28* | (2006.01) | |
| *A01K 69/08* | (2006.01) | |

(52) U.S. Cl.
CPC .............. *B63B 22/06* (2013.01); *B63B 22/28* (2013.01); *A01K 69/08* (2013.01)

(58) Field of Classification Search
CPC .......... B63B 22/06; B63B 22/28; A01K 69/08
See application file for complete search history.

(56) References Cited

U.S. PATENT DOCUMENTS

| | | | |
|---|---|---|---|
| 990,580 | A | 4/1911 | Mueller |
| 1,504,004 | A | 8/1924 | Vienneau |
| | | (Continued) | |

FOREIGN PATENT DOCUMENTS

| | | |
|---|---|---|
| AU | 1091195 A | 5/1995 |
| CA | 2057361 A1 | 6/1993 |
| | (Continued) | |

OTHER PUBLICATIONS

International Search Report issued in PCT/CA2023/050005.

*Primary Examiner* — Eldon T Brockman
(74) *Attorney, Agent, or Firm* — The Belles Group, P.C.

(57) ABSTRACT

The present disclosure includes an underwater retrieval device for retrieving an underwater instrument. The device includes a buoyancy means, a cable reel, a controller configured to receive an external signal, a release mechanism in communication with the controller, and a locking mechanism configured to lock the cable reel. The locking mechanism can comprise a locking pin engageable with the cable reel, a locking lever biased in an unlocked configuration, and a lock for securing the locking lever in the locked configuration. There is also provided an underwater retrieval system that includes the underwater retrieval device and a rewinder device that can rewind the device without disassembly or (Continued)

replacement of parts. When the device receives the external signal, the controller sends a signal to the release mechanism, which releases the lock and unlocks the cable reel, which allows the device to return to the surface via the buoyancy means.

20 Claims, 13 Drawing Sheets

(56) References Cited

U.S. PATENT DOCUMENTS

| | | | |
|---|---|---|---|
| 2,722,019 A | 11/1955 | Brock | |
| 3,160,360 A | 12/1964 | Robert et al. | |
| 3,162,395 A | 12/1964 | Bray | |
| 3,363,849 A | 1/1968 | Lowrie | |
| 3,367,602 A | 2/1968 | Vilhelm | |
| 3,504,407 A | 4/1970 | Dawson | |
| 3,602,959 A | 9/1971 | Perez | |
| 3,643,886 A | 2/1972 | Colton | |
| 3,722,014 A | 3/1973 | Hill et al. | |
| 3,749,933 A | 7/1973 | Davidson | |
| 3,848,226 A | 11/1974 | Perez | |
| 3,858,166 A | 12/1974 | Hammond | |
| 3,889,307 A * | 6/1975 | Houot | E21B 41/10 |
| | | | 367/133 |
| 3,912,191 A | 10/1975 | Anderson et al. | |
| 4,067,282 A | 1/1978 | Guinn et al. | |
| 4,136,415 A | 1/1979 | Blockburger | |
| 4,262,379 A | 4/1981 | Jankiewicz | |
| 4,664,559 A | 5/1987 | Berrang | |
| 4,808,133 A | 2/1989 | Gram et al. | |
| 4,974,536 A | 12/1990 | Archibald | |
| 5,022,013 A | 6/1991 | Dalton et al. | |
| 5,184,328 A | 2/1993 | Dumestre, III | |
| 5,195,688 A | 3/1993 | Clemmons | |
| 5,219,245 A | 6/1993 | Chin-Yee | |
| 5,385,314 A | 1/1995 | Hughes | |
| 5,418,757 A | 5/1995 | Rau et al. | |
| 5,449,308 A | 9/1995 | Thompson | |
| 5,513,886 A | 5/1996 | Cyr | |
| 6,261,142 B1 | 7/2001 | Fiotakis | |
| 6,739,924 B1 | 5/2004 | Groen et al. | |
| 7,138,603 B2 | 11/2006 | Flagg et al. | |
| 7,534,152 B1 * | 5/2009 | Lloyd | A01K 69/06 |
| | | | 441/2 |
| 8,353,735 B2 | 1/2013 | Biousse | |
| 9,889,905 B2 | 2/2018 | Albertson | |
| 10,023,280 B2 | 7/2018 | Penven et al. | |
| 10,375,939 B2 * | 8/2019 | Partan | A01K 69/08 |
| 11,760,443 B2 * | 9/2023 | Wang | B66D 5/32 |
| | | | 441/2 |
| 2003/0110677 A1 | 6/2003 | Lindgren | |
| 2005/0082409 A1 | 4/2005 | Jundt et al. | |
| 2011/0034094 A1 | 2/2011 | Biousse | |
| 2013/0109257 A1 | 5/2013 | Abulrassoul et al. | |
| 2013/0193391 A1 | 8/2013 | Fok et al. | |
| 2014/0239871 A1 | 8/2014 | Savva et al. | |
| 2014/0348593 A1 | 11/2014 | Kawahara et al. | |
| 2017/0332612 A1 * | 11/2017 | Partan | A01K 69/08 |
| 2018/0222556 A1 | 8/2018 | Erlendsson et al. | |
| 2021/0339832 A1 * | 11/2021 | Wang | B66D 1/28 |
| 2022/0378026 A1 | 12/2022 | Vincent et al. | |
| 2024/0109622 A1 | 4/2024 | Cotton | |

FOREIGN PATENT DOCUMENTS

| | | | |
|---|---|---|---|
| CA | 3038171 A1 | 9/2020 | |
| CA | 3098062 A1 | 5/2022 | |
| CN | 206767280 U | 12/2017 | |
| CN | 208037702 U | 11/2018 | |
| CN | 208780815 U | 4/2019 | |
| CN | 110203759 A | 9/2019 | |
| CN | 110844721 A | 2/2020 | |
| CN | 210339902 U | 4/2020 | |
| CN | 111924646 A | 11/2020 | |
| CN | 212625452 U | 2/2021 | |
| CN | 113335997 A | 9/2021 | |
| CN | 115056946 A | 9/2022 | |
| DE | 3034707 A1 | 4/1982 | |
| EP | 0148571 A2 | 7/1985 | |
| EP | 2521687 A1 | 11/2012 | |
| EP | 1902939 A2 | 3/2018 | |
| EP | 3390215 A1 | 10/2018 | |
| EP | 3186140 B1 | 9/2020 | |
| FR | 2160277 A1 | 6/1973 | |
| FR | 2795703 A1 | 1/2001 | |
| JP | H05219869 A | 8/1993 | |
| WO | 1991002676 A1 | 3/1991 | |
| WO | 9513211 A1 | 5/1995 | |
| WO | 1998045169 A1 | 10/1998 | |
| WO | 2004069642 A2 | 8/2004 | |
| WO | 2011084070 A1 | 7/2011 | |
| WO | 2015077822 A1 | 6/2015 | |
| WO | 2017103513 A1 | 6/2017 | |
| WO | 2018162537 A1 | 9/2018 | |
| WO | 2021097364 A1 | 5/2021 | |
| WO | 2022246563 A1 | 12/2022 | |

* cited by examiner

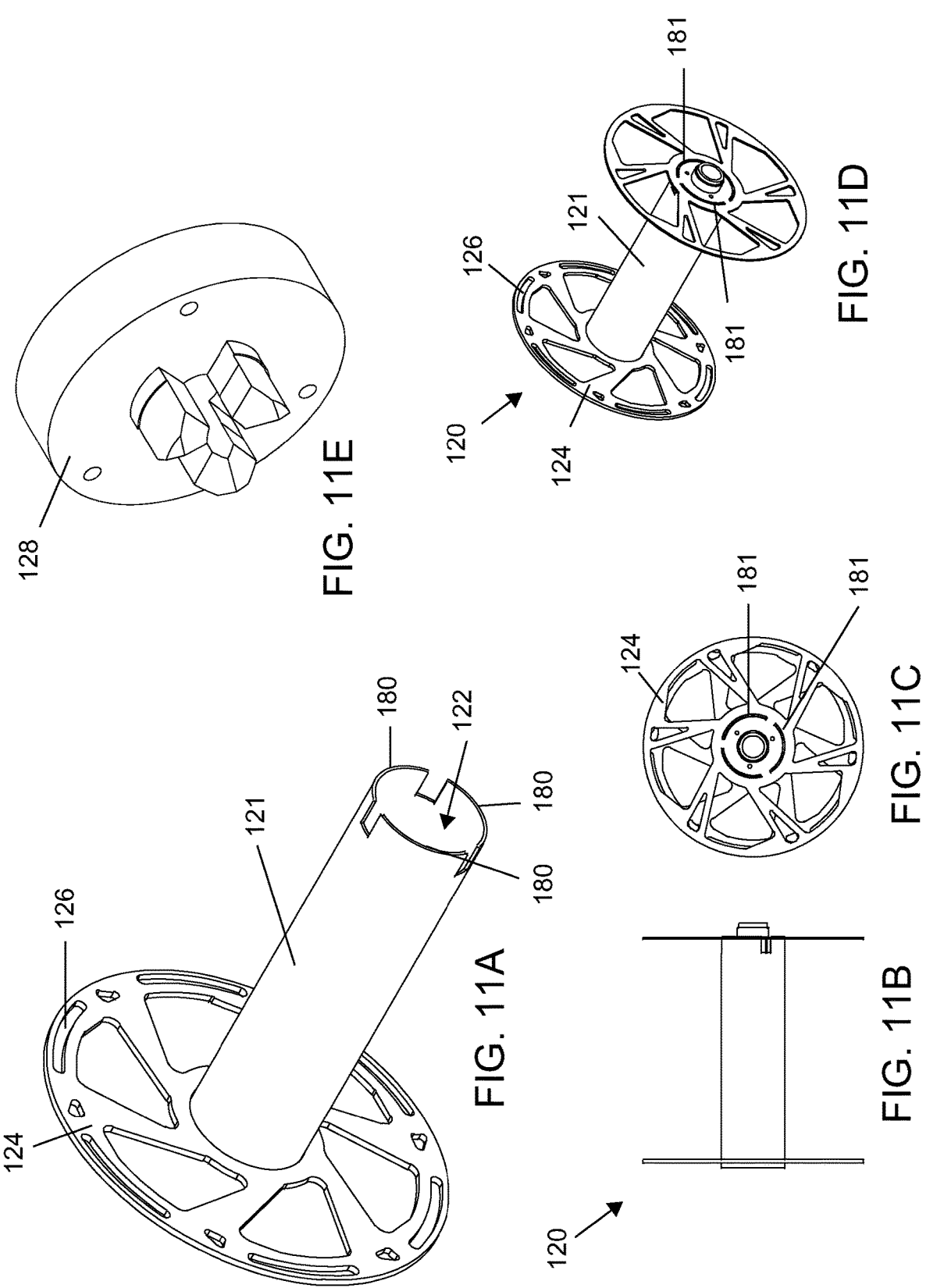

FIG. 14

UNDERWATER RETRIEVAL DEVICE AND REWINDING SYSTEMS

CROSS-REFERENCE TO RELATED APPLICATIONS

This Patent Application is a U.S. national stage application under 35 U.S.C. § 371 of PCT Application No. PCT/CA2023/050005, filed Jan. 5, 2023, which claims priority from U.S. Provisional Patent Application Ser. No. 63/266,499, filed Jan. 6, 2022, the entireties of which are incorporated herein by reference.

TECHNICAL FIELD

The present disclosure relates to recovery systems for submerged instruments. In particular, the present disclosure relates to an underwater retrieval device and rewinding system.

BACKGROUND

There are many submersible instruments, such as scientific equipment or fishing equipment, that are deployed to the bottom of a body of water for a set period of time. To assist with retrieval of these instruments, buoys can be deployed with a rope extending vertically from the instrument to the buoy. However, these ropes create obstacles for marine animals and can cause injury and disrupt migratory patterns. Furthermore, surface buoys are a visible sign to the public of the underwater instrument, which can lead to theft or unauthorized tampering with the instrument. Additionally, the retrieval line of the buoy that extends from the bed of the body of water to the surface can get tangled in boat propellers or with marine animals, causing economical and ecological damage.

There are on-call or on-demand recall buoy systems for commercial fisheries that secure a retrieval line near the bottom of the sea with the submerged instrument and upon activation can carry the retrieval line to the water surface. These on-call systems include devices that are configured to inflate or release the anchor upon command, thus raising the retrieval line to the surface. However, most on-call systems require expensive equipment on the boat deck to communicate with the submerged recall buoy system. Furthermore, if these devices malfunction or become incapable of receiving a signal to release the retrieval line, the submerged instruments can be lost.

Other recall buoy systems use a buoyant retrieval line spool that is connected to an anchor and the underwater instrument. When a signal is received to retrieve the item, these recall systems release the anchor and the buoyant retrieval line floats to the surface. However, these recall buoy systems are connected to the anchor at an end thereof with the spool being released with a single connection point of the rope attachment to the underwater instrument. This spool design results in the spool floating to the surface in a vertical orientation or rotational manner that can prevent a proper and efficient unwinding of the retrieval line and cause knots or loops in the retrieval line, which can impede the device from returning to the surface. Furthermore, some spool designs may not allow the recall buoy system to be rewound without completely unwinding the spool or require the spool to be separated from the buoy before rewinding, thus not allowing the user to easily rewind the spool for subsequent use while retrieving the submerged instrument.

Furthermore, if the connection between the retrieval line and the anchor is not severed, the submerged instruments can be lost.

Other recall buoy systems use a temporary connection that erodes in the water to release the retrieval line after a set amount of time underwater. These systems can often only be deployed for a single use or require significant maintenance or expensive parts to prepare for redeployment. Furthermore, these recall buoy systems do not allow the user to retrieve the submerged instrument at a specific time or allow the user to change the time to recall the instrument.

In view of the above, there is a need for cost-effective devices which would be able to overcome or at least minimize some of the above-discussed prior art concerns.

SUMMARY

It is therefore an aim of the present invention to address the above-mentioned issues.

According to one aspect, there is provided an underwater retrieval device comprising: an outer frame configured to be operatively connected to a buoyancy means; an inner frame rotatably mounted inside the outer frame, the inner frame being configured to receive a cable disposed around an outside thereof; a locking mechanism selectively configurable in a locked configuration and an unlocked configuration, the locking mechanism comprising a locking lever pivotally connected to the outer frame and a locking pin, wherein the locking pin is engaged with the inner frame in the locked configuration of the locking mechanism and disengaged from the inner frame when in the unlocked configuration of the locking mechanism, the locking lever being biased away from the inner frame or the outer frame; and a controller including an external signal sensor and being operatively connected to the locking mechanism to selectively configure the locking mechanism in the unlocked configuration in response to an external signal received by the external signal sensor.

In some embodiments, the locking mechanism further comprises a biasing means to bias the locking lever away from the inner frame or the outer frame.

In some embodiments, the biasing means is coupled to the locking lever adjacent to or around the locking pin.

In some embodiments, the biasing means comprises a spring.

In some embodiments, the biasing means comprises a hinge spring provided at a pivot point between the outer frame and the locking lever.

In some embodiments, the locking pin is configured to break when a predetermined force is applied thereon.

In some embodiments, the inner frame further comprises at least one flange having at least one aperture defined therein and being engageable by the locking pin of the locking mechanism in the locked configuration.

In some embodiments, the at least one aperture is adjacent to a periphery of the at least one flange.

In some embodiments, the locking mechanism further comprises a lock comprising a first portion coupled to the locking lever and a second portion coupled to the outer frame, wherein the first portion and the second portion are releasably coupled together in the locked configuration.

In some embodiments, the lock is a magnetic lock.

In some embodiments, one of the first portion and the second portion comprises a ferromagnetic material and another one of the first portion and the second portion comprises a magnet.

In some embodiments, the ferromagnetic material comprises iron, cobalt, or nickel.

In some embodiments, the magnet is an electropermanent magnet.

In some embodiments, the locking mechanism further comprises a release mechanism coupled to the lock and configured to receive an unlocking signal from the controller, wherein when the release mechanism receives the unlocking signal, the release mechanism uncouples the first portion and the second portion.

In some embodiments, the release mechanism comprises an electromagnetic coil.

In some embodiments, the underwater retrieval device further comprises a redundant release mechanism coupled at a first end to the locking lever and at a second end to the lock.

In some embodiments, the redundant release mechanism comprises a galvanic timed release connector.

In some embodiments, a longitudinal axis of the inner frame extends substantially horizontally when the underwater retrieval device is submerged.

In some embodiments, the underwater retrieval device further comprises the buoyancy means, wherein the buoyancy means is integrated in the outer frame.

In some embodiments, the controller is coupled to or integrated in the outer frame.

In some embodiments, the underwater retrieval device further comprises a hermetic capsule configured to retain at least one of the controller and the release mechanism.

In some embodiments, the hermetic capsule is concentric to a center of the inner frame.

In some embodiments, the external signal is one of an acoustic signal, a radio frequency signal, a digitally encoded signal, and sonar.

In some embodiments, the external signal is encoded.

In some embodiments, the controller comprises a transducer.

In some embodiments, the transducer is an electroacoustic transducer.

In some embodiments, the external signal is an acoustic signal.

In some embodiments, the controller is configured for bidirectional communication with a boat unit.

In some embodiments, the controller further comprises a GPS unit.

In some embodiments, the inner frame comprises a cable reel.

In some embodiments, the inner frame comprises a spool.

In some embodiments, the inner frame further comprises a shaft coupling configured to couple to a rewinding device.

In some embodiments, the controller further comprises a secondary release mechanism configured to send the unlocking signal to the release mechanism after a predetermined amount of time.

In some embodiments, the underwater retrieval device further comprises the cable operatively coupled to one of the outer frame and the inner frame.

In some embodiments, the underwater retrieval device further comprises at least one secondary sensor.

In some embodiments, the at least one secondary sensor is a battery monitor, a water ingress monitor, a pressure sensor, or an inertial measurement unit.

According to another aspect, there is provided an underwater retrieval device comprising: a housing; a cable reel rotatably mounted to the housing and configured to receive a cable disposed around an outside thereof, the housing at least partially surrounding the cable reel; a buoyancy means operatively connected to the cable reel; a controller configured to receive an external signal and send an unlocking signal; an electromagnetic coil in data communication with the controller and configured to receive the unlocking signal; a locking mechanism configured to secure the cable reel in a locked configuration, the locking mechanism comprising: a locking lever pivotally attached to the housing and engageable with the cable reel, the locking lever being movable from the locked configuration to an unlocked configuration; a magnetic lock comprising a ferromagnetic material coupled to the locking lever and an electropermanent magnet coupled to the cable reel and being magnetically coupled in the locked configuration, the electropermanent magnet being neutralized when the electromagnetic coil receives the unlocking signal, wherein the locking lever is biased away from the cable reel such that, when the magnetic lock is released, the locking lever disengages from the cable reel.

In some embodiments, the underwater retrieval device further comprises a locking pin coupled to the locking lever for engaging with the cable reel.

In some embodiments, the underwater retrieval device further comprises biasing means to bias the locking lever away from the cable reel.

In some embodiments, the biasing means is coupled to the locking lever around the locking pin or adjacent to a pivot point between the housing and the locking lever.

In some embodiments, the biasing means comprises a spring.

In some embodiments, the biasing means comprises a hinge spring provided at a pivot point between the housing and the locking lever.

In some embodiments, the cable reel comprises a flange with an aperture extending therethrough and the locking pin is engageable with the cable reel through the aperture on the flange of the cable reel.

In some embodiments, the ferromagnetic material comprises iron, cobalt, or nickel.

In some embodiments, the underwater retrieval device further comprises a redundant release mechanism coupled at a first end to the locking lever and at a second end to the magnetic lock.

In some embodiments, the redundant release mechanism comprises a galvanic timed release connector.

In some embodiments, a longitudinal axis of the cable reel extends substantially horizontally when the underwater retrieval device is submerged.

In some embodiments, the buoyancy means is coupled to or integrated in the housing.

In some embodiments, the controller is coupled to or integrated in the housing.

In some embodiments, the underwater retrieval device further comprises a hermetic capsule configured to retain at least one of the controller and the release mechanism.

In some embodiments, the hermetic capsule is concentric to a center of the cable reel.

In some embodiments, the external signal is one of an acoustic signal, a radio frequency signal, a digitally encoded signal, and sonar.

In some embodiments, the external signal is encoded.

In some embodiments, the controller comprises a transducer.

In some embodiments, the transducer is an electroacoustic transducer.

In some embodiments, the external signal is an acoustic signal.

In some embodiments, the controller is configured for bidirectional communication with a boat unit.

In some embodiments, the controller further comprises a GPS unit.

In some embodiments, the cable reel comprises a spool.

In some embodiments, the cable reel further comprises a shaft coupling configured to couple to a rewinding device.

In some embodiments, the controller further comprises a secondary release mechanism configured to send the unlocking signal to the release mechanism after a predetermined amount of time.

In some embodiments, the underwater retrieval device further comprises the cable operatively coupled to one of the housing and the cable reel.

In some embodiments, the underwater retrieval device further comprises at least one secondary sensor.

In some embodiments, the at least one secondary sensor is a battery monitor, a water ingress monitor, a pressure sensor, or an inertial measurement unit.

According to another aspect, there is provided a method of retrieving an underwater instrument, the method comprising: deploying the underwater instrument with an underwater retrieval device, the underwater retrieval device comprising: a buoyancy means; a cable reel operatively connected to the buoyancy means; a locking mechanism configured to engage with the cable reel when in a locked configuration; a release mechanism operatively connected to the locking mechanism; and a controller configured to receive an external signal from a boat unit, the controller being in data communication with the release mechanism and configured to send an unlocking signal to the release mechanism in response to the external signal, wherein the release mechanism is configured to disengage the locking mechanism from the cable reel when the unlocking signal is received from the controller; sending the external signal to the controller via the boat unit; and retrieving the underwater instrument via the underwater retrieval device.

In some embodiments, retrieving the underwater instrument comprises rewinding the cable reel via a shaft coupling.

In some embodiments, the external signal is an acoustic signal and the controller comprises an electroacoustic transducer.

In some embodiments, the method further comprises setting the controller to send the unlocking signal after a predetermined amount of time.

In some embodiments, the controller comprises a GPS unit and the method further comprises locating the underwater instrument via the GPS unit.

According to another aspect, there is provided an underwater retrieval device comprising: an outer frame configured to be operatively connected to a buoyancy means; an inner frame rotatably mounted to the outer frame with the outer frame at least partially surrounding the inner frame, the inner frame being configured to receive a cable disposed around an outside thereof and wherein the inner frame comprises a shaft coupler accessible from an outside of the outer frame, the shaft coupler being configured to engage in rotation the inner frame while the outer frame remains stationary; a controller configured to receive an external signal; and a locking mechanism mounted to the outer frame and engageable with the inner frame to prevent a rotation thereof and disengageable from the inner frame in response to the external signal to allow a rotation of the inner frame.

In some embodiments, the underwater retrieval device further comprises the buoyancy means, wherein the buoyancy means is integrated in the outer frame or the inner frame.

In some embodiments, the locking mechanism comprises a locking pin that is engageable with the inner frame.

In some embodiments, a longitudinal axis of the inner frame extends substantially horizontally within the outer frame when the underwater retrieval device is submerged.

In some embodiments, the outer frame and/or the buoyancy means are configured to retain the outer frame in a horizontal configuration when the underwater retrieval device is submerged.

In some embodiments, the controller is coupled to or integrated in the outer frame.

In some embodiments, the underwater retrieval device further comprises a hermetic capsule configured to retain at least one of the controller and a release mechanism configured to disengage the locking mechanism from the inner frame in response to the external signal.

In some embodiments, the hermetic capsule is concentric to a center of the inner frame.

In some embodiments, the hermetic capsule is integrated in the inner frame.

In some embodiments, the inner frame comprises a cable reel or a spool.

In some embodiments, the shaft coupling is configured to couple to a rewinding device.

According to another aspect, there is provided an underwater retrieval system comprising an underwater retrieval device and a rewinding device; the underwater retrieval device comprising: a buoyance means; an outer frame operatively connected to the buoyancy means; an inner frame rotatably mounted to and located inside the outer frame; and a shaft coupler located at a distal end of the inner frame, the shaft coupler being configured to engage in rotation the inner frame within the outer frame; the rewinding device comprising: a frame having an underwater retrieval device receiving section; a rotatable coupler configured to engage with the shaft coupler of the underwater retrieval device received in the underwater retrieval device receiving section of the frame; and an actuating means to rotate the rotatable coupler.

In some embodiments, at least one of: the rotatable coupler and the frame is vertically translatable to adjust to a relative position of the rotatable coupler and the underwater retrieval device received in the underwater retrieval device receiving section of the frame.

In some embodiments, the frame comprises a first end and a second end and at least one of the first end and the second end of the housing is horizontally translatable to adjust to a length of the underwater retrieval device receiving section of the frame to substantially correspond to a length of the outer frame.

In some embodiments, the inner frame comprises a cable reel.

In some embodiments, the shaft coupler extends outside of the outer frame to couple the rotatable coupler and the shaft coupler together.

In some embodiments, the rewinding device further comprises a surface controller and the underwater retrieval device further comprises an underwater controller, wherein the surface controller is configured to send an external signal to the underwater controller.

In some embodiments, the underwater retrieval device further comprises a locking mechanism selectively configurable to prevent and allow rotation of the inner frame with respect to the outer frame.

In some embodiments, the underwater controller is configured to send signals to the surface controller.

In some embodiments, the underwater retrieval device further comprises at least one secondary sensor.

In some embodiments, the at least one secondary sensor is a battery monitor, a water ingress monitor, a pressure sensor, or an inertial measurement unit.

BRIEF DESCRIPTION OF THE DRAWINGS

In order that the invention may be readily understood, embodiments of the invention are illustrated by way of example in the accompanying drawings.

FIG. 11A is a partial perspective side view of a cable reel for use with the underwater retrieval device shown in FIG. 4, the cable reel includes a barrel and a flange;

FIG. 11B is a side view of a cable reel for use with the underwater retrieval device shown in FIG. 4, the cable reel includes a barrel and two flanges;

FIG. 11C is a front plan view of the cable reel shown in FIG. 11B;

FIG. 11D is a perspective side view of the cable reel shown in FIG. 11B;

FIG. 11E is a side view of a shaft coupling for use with the cable reel shown in FIG. 11D;

FIG. 14 is a perspective front view of a rewinder device according to one embodiment;

DETAILED DESCRIPTION

As described herein, there is provided an underwater retrieval device that includes an outer frame that is buoyant or configured to be attached to a buoy and an inner frame configured to have a cable wrapped around an outside thereof. The inner frame is rotatable within the outer frame and the underwater retrieval device includes a locking mechanism that engages and disengages with the inner frame to prevent and allow, respectively, the rotation of the inner frame. Accordingly, the system can be deployed with an instrument to the bed of a water system with the locking mechanism engaged with the inner frame to prevent its rotation and when the device is unlocked (i.e., the locking mechanism disengages from the inner frame), the inner frame can rotate to unwind and allow the underwater retrieval device to rise to the water surface.

There is also provided an underwater retrieval system that includes the aforementioned underwater retrieval device and a rewinding device that act in coordination with each other. After the underwater retrieval device has been deployed (i.e. submerged in the body of water), the rewinding device can be used to send the signal to return the underwater retrieval device to the water surface and then facilitate the rewinding of the inner frame for subsequent use without disassembly or replacement of parts. The rewinding device supports the outer frame while simultaneously rotating the inner frame to rewind or wrap the cable around the inner frame.

Figure 1:
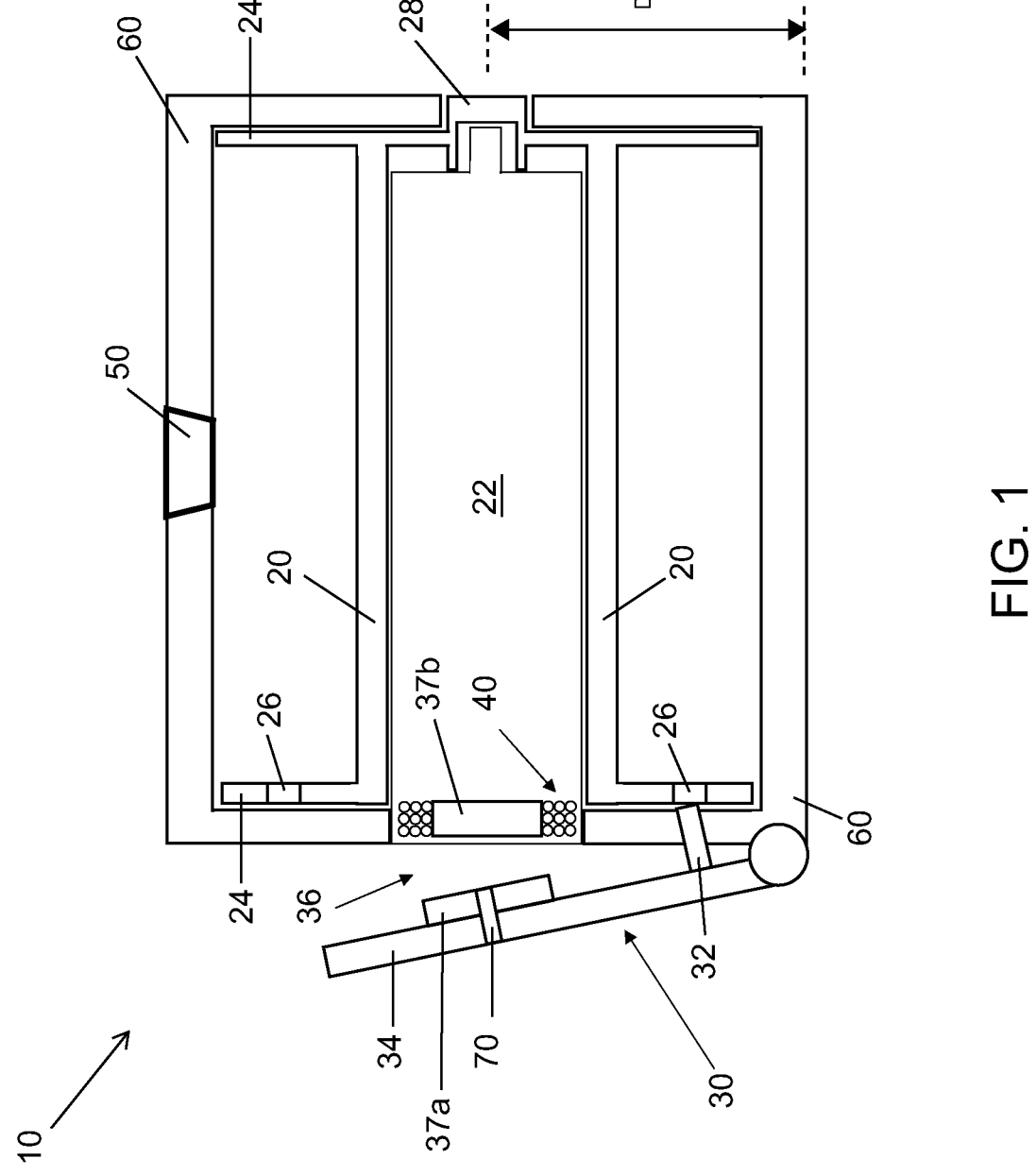
FIG. 1 is a cross-sectional view of an underwater retrieval device in accordance with a first embodiment shown in an unlocked configuration.
Figure 2:
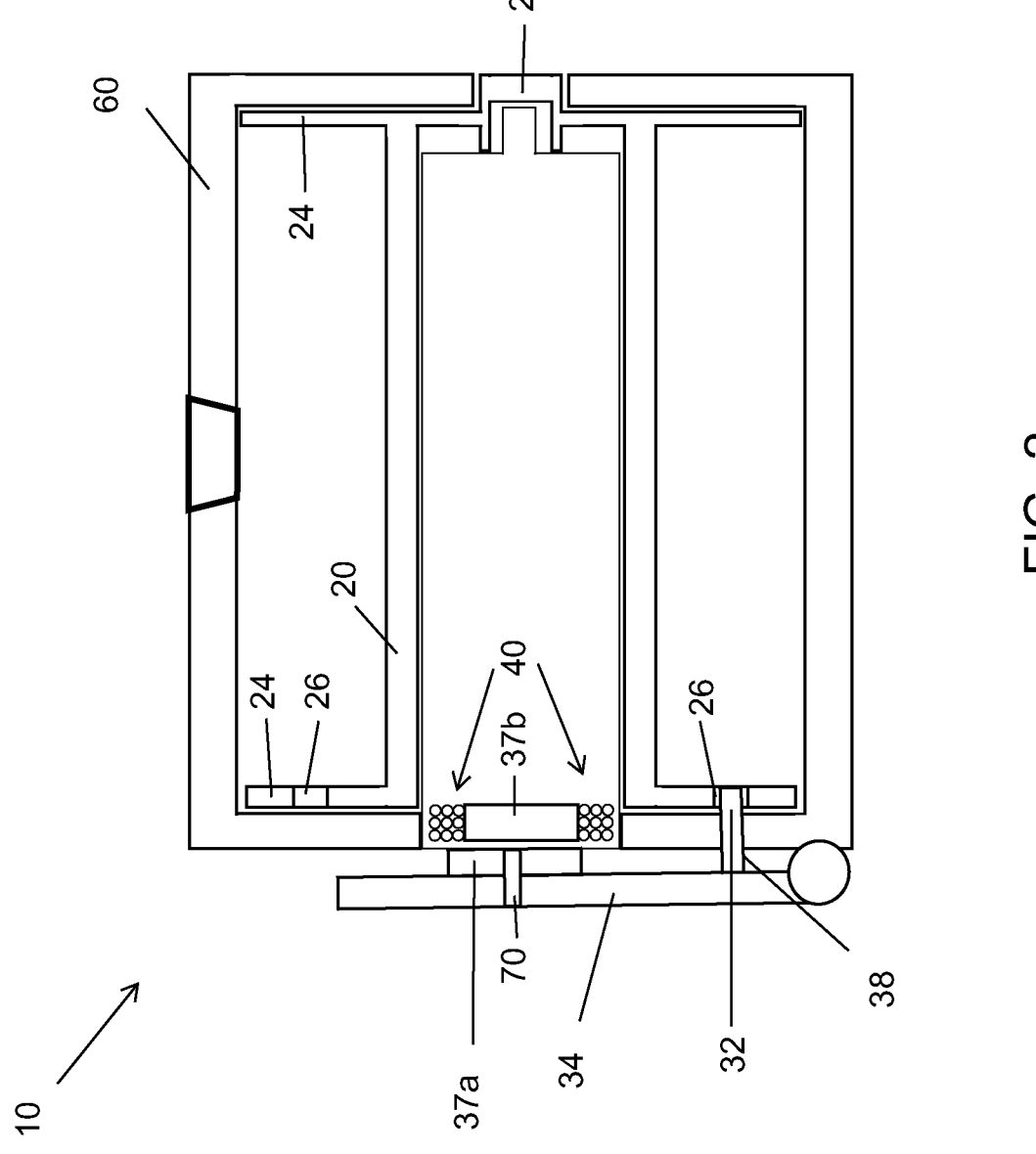
FIG. 2 is a cross-sectional view of the underwater retrieval device shown in FIG. 1 in a locked configuration.

Referring now to FIGS. 1 and 2, an underwater retrieval device 10 in an unlocked configuration (FIG. 1) and a locked configuration (FIG. 2) is shown. The underwater retrieval device 10 comprises an inner frame or cable reel 20, a locking mechanism 30, a release mechanism 40, a controller 50 and an outer frame or housing 60 configured to be buoyant or to couple to a buoyancy means (i.e., the housing 60 is operatively connected to buoyancy means). When the underwater retrieval device 10 is in the locked configuration, the device 10 can be deployed with an underwater instrument, including, without limitation, a fishing net or trap, a scientific instrument, oil and gas equipment, communication lines, etc. The underwater instrument should have a sufficient weight to retain the buoyancy means integrated in the housing 60 or the buoyancy means coupled to the housing 60 under the water or the underwater retrieval device 10 can be deployed with an anchor having a sufficient weight to keep the underwater instrument and the underwater retrieval device 10 submerged while in the locked configuration.

The locking mechanism 30 is engageable with the cable reel 20 such that in the locked configuration, the cable reel 20 does not rotate and thus does not unwind the cable. The release mechanism 40 is in communication with the controller 50 and is configured to release the locking mechanism 30 upon receiving an unlocking signal from the controller 50, thus moving the cable reel 20 into an unlocked configuration. When the user is seeking to retrieve the underwater instrument, the user, such as a fisherman seeking to retrieve a fishing trap, can send an external signal to a receiver, such as an acoustic modem, that forms part of the controller 50 via a boat unit. The external signal can include various types of control signals, including, without limitation, acoustic, radio frequency, digitally encoded signal, and sonar. In some embodiments, the external signal can be encoded to prevent unauthorized users from retrieving the underwater retrieval device. Once the external signal is received, the controller 50 sends an unlocking signal to the release mechanism 40, which releases the locking mechanism and moves the device 10 into the unlocked configuration, thus allowing the cable reel 20 to freely rotate. The buoyancy means coupled to or integrated in the housing 60 forces the underwater retrieval device 10 to the surface, thus unwinding the cable reel 20 and extending a cable 21, which is attached to the anchor and/or underwater instrument, from the bed of the body of water to the water surface.

Figure 3:
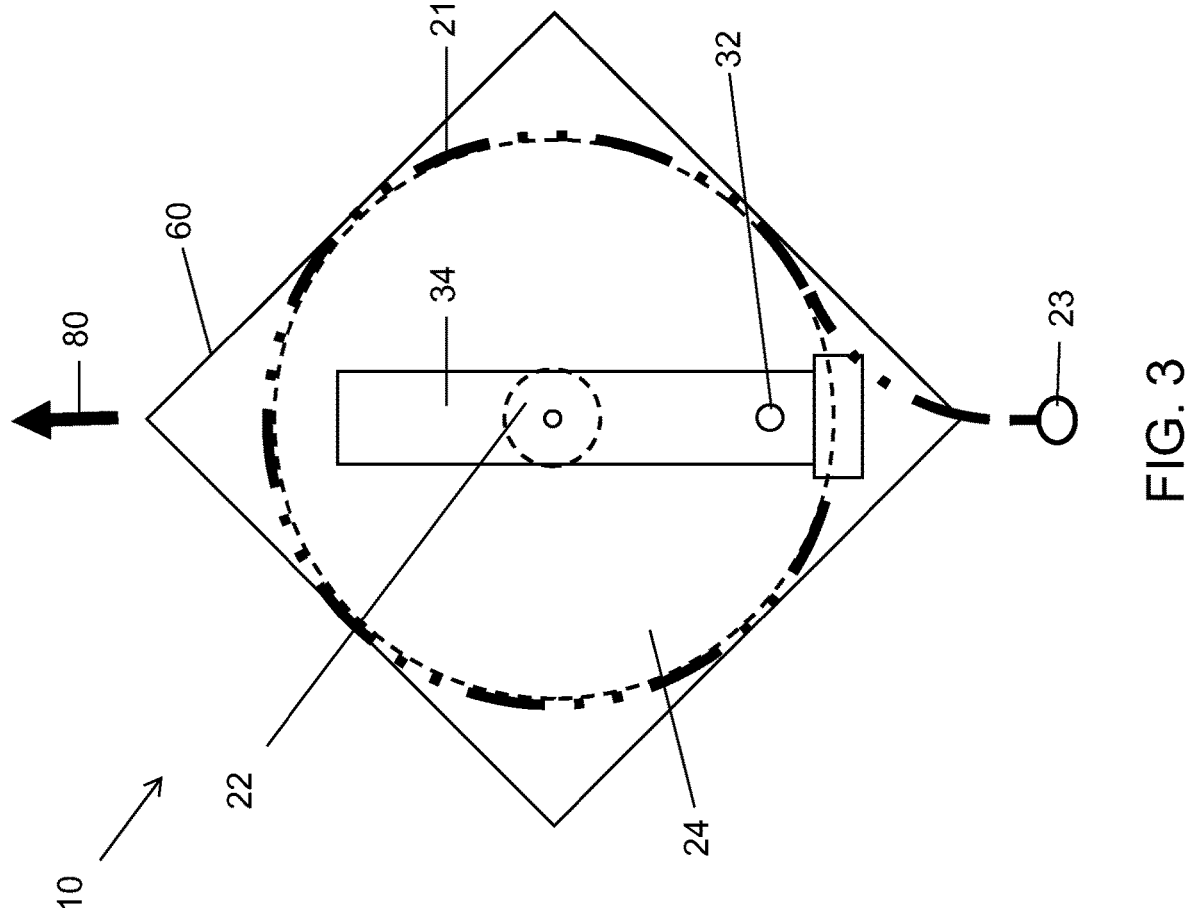
FIG. 3 is a partially transparent front view of the underwater retrieval device shown in FIG. 1 in a locked configuration.
Figure 4:
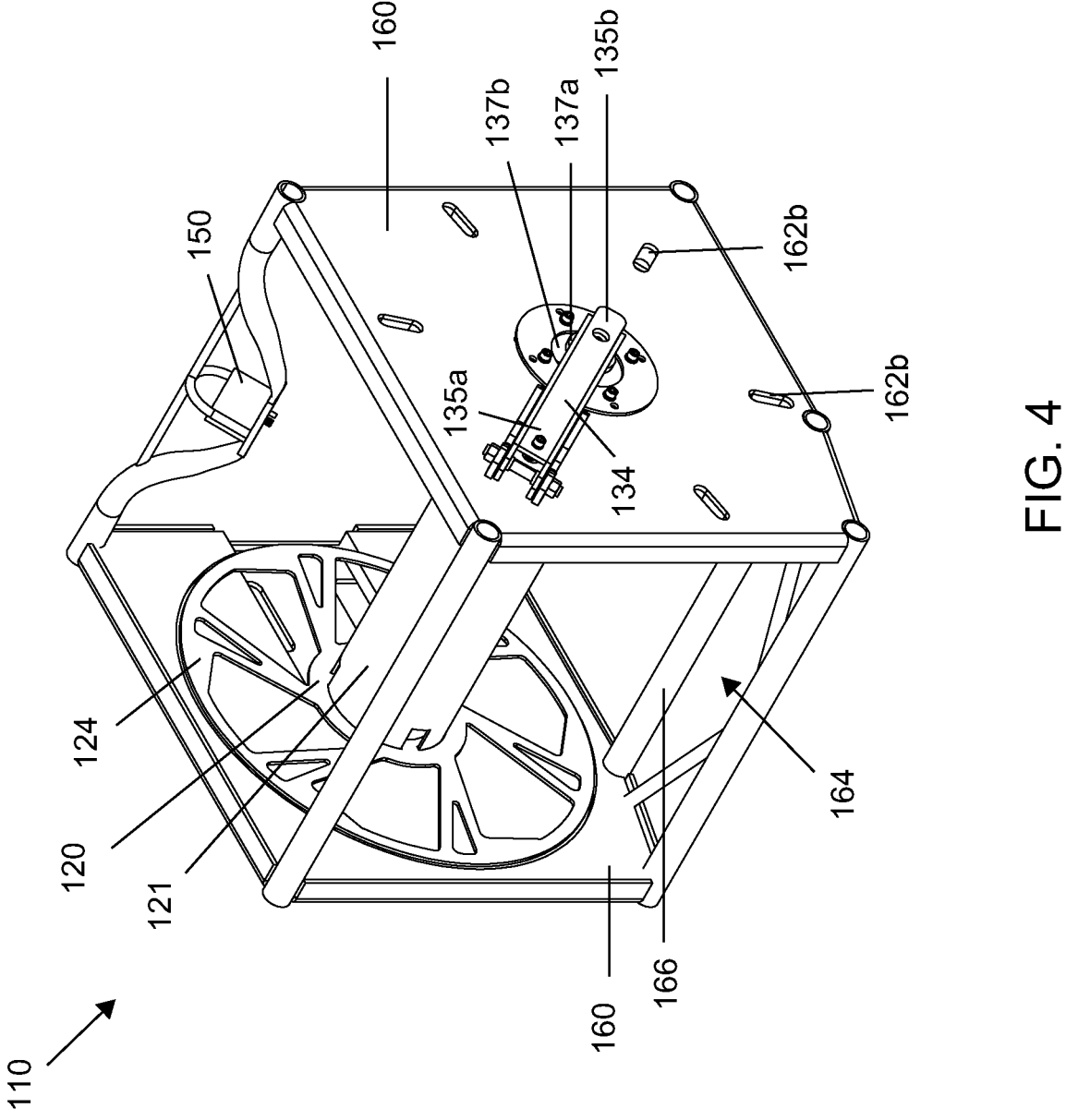
FIG. 4 is a perspective front view of an underwater retrieval device in accordance with another embodiment shown in a locked configuration.
Figures 5, 6:
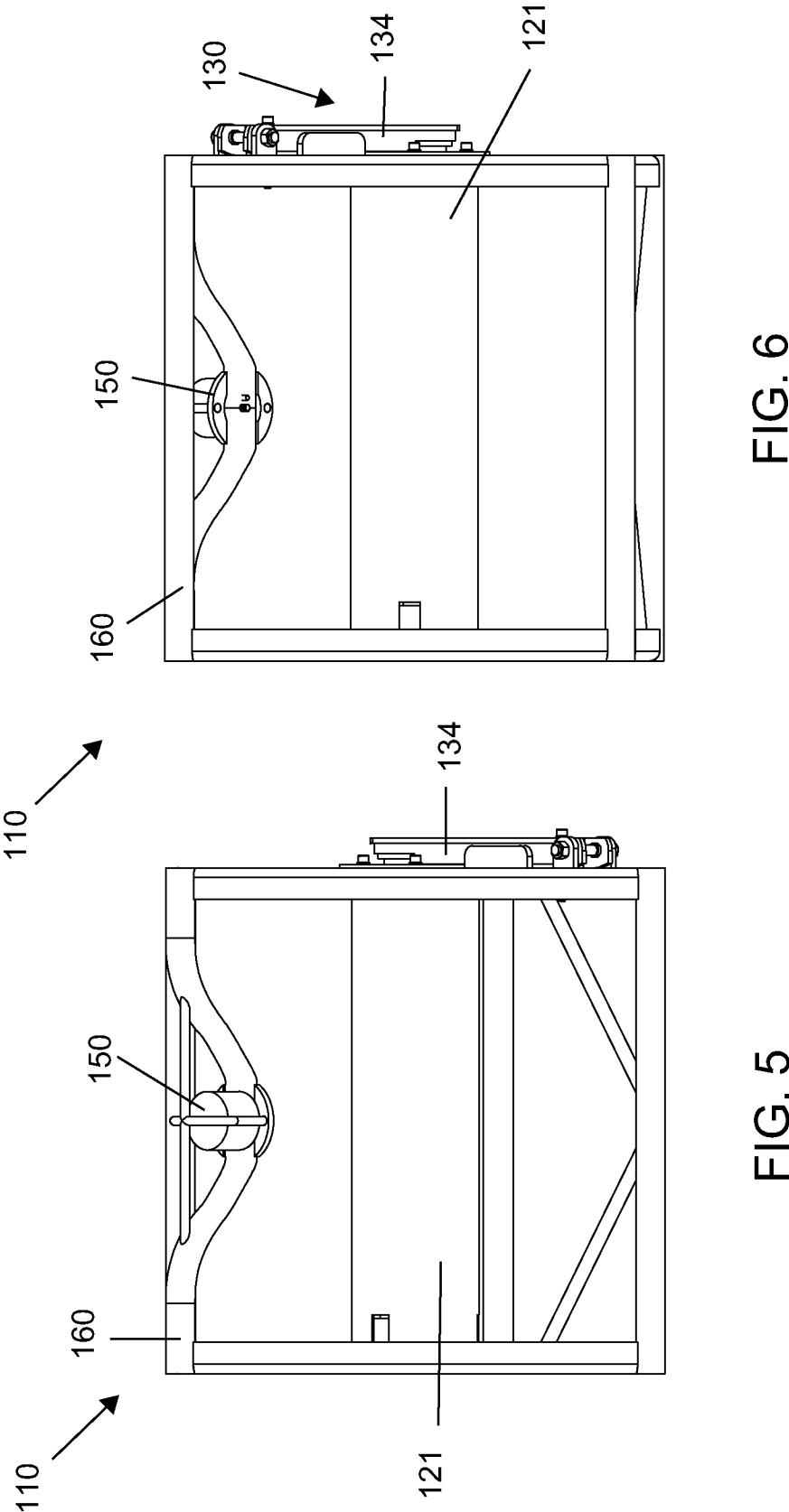
FIG. 5 is a first side view of the underwater retrieval device shown in FIG. 4.
FIG. 6 is a second side view of the underwater retrieval device shown in FIG. 4.

The inner frame or cable reel 20 is configured to receive a cable 21 (as shown in FIG. 3) disposed around an outside thereof. In some embodiments, the inner frame or cable reel 20 is a spool or reel or other cylindrical body configured to have a rope or cable wrapped around an outside thereof. However, other inner frames that include a body that facilitates the winding or coiling of a rope or cable 21 around an outside thereof when rotated can also be used. In some embodiments, the inner frame or cable reel 20 is configured to prevent the rope from becoming entangled or otherwise not unwinding properly during use. For example, by being configured to remain in a horizontal position during the duration of the unwinding.

The cable 21 is configured to be operatively connected to the housing 60 or the cable reel 20 at a first end and to an anchor and/or the submerged instrument at a second end. The cable 21 has a length that is sufficient to extend between the bed of the body of water and the water surface. In the event the underwater instrument is moved to a deeper depth by underwater forces, such as current, it may be desirable to have a length of cable that is longer than the depth of the water the underwater retrieval device 10 is being deployed in. In the locked configuration (as shown in FIG. 2), the cable 21 is wound around the cable reel 20 and the cable reel 20 is unable to rotate freely, thus securing the underwater retrieval device 10 near the submerged instrument on the floor of the body of water until the underwater retrieval device 10 is placed in the unlocked configuration.

In some embodiments, the inner frame or cable reel 20 can include a hollow core 22. In the exemplary embodiment, the hollow core 22 is a hermetic capsule that houses the electronic and power components. In some embodiments, the hermetic capsule houses the release mechanism 40 and/or the controller 50. In other embodiments, the shaft or core of the cable reel 20 can be solid or can be perforable to allow water to enter. In other embodiments, the shaft or core of the cable reel can comprise the buoyancy means.

In some embodiments, the inner frame or cable reel 20 can include flanges 24 positioned on one or both distal ends of the barrel of the cable reel 20. The flanges 24 can be sized to have a radial distance from the shaft or hollow core 22 of the cable reel 20 that is equal to or larger than the radial distance from the periphery of the cable 21 when wound around the cable reel 20. Accordingly, when the underwater retrieval device 10 is used in deep waters, thus requiring a long cable 21, the flanges 24 on the cable reel 20 may extend further from the shaft or hollow core 22 to provide support on the edges of the cable reel 20 for the cable 21. At least one of the flanges 24 can include an aperture 26 configured to receive and/or engage with the locking mechanism 30. Other mechanisms for engaging with the locking mechanism 30 are also contemplated, such as a groove or recess. In some embodiments, the inner frame or cable reel 20 can be devoid of flanges. For example, the inner frame can be a barrel with one or more protrusions extending radially from an end of the barrel, such that when the locking mechanism is in the locked configuration, the protrusion(s) engages with the locking mechanism. In other embodiments, the inner frame can be a barrel without any flanges or protrusions, such that when in the locked configuration, the locking mechanism engages the end of the barrel, such as with a clamp or other means.

In some embodiments, the cable reel 20 can include a shaft coupling 28 at a distal end of the cable reel 20 that is opposite to the locking mechanism 30. The shaft coupling 28 is configured to couple to a device to re-reel or rewind the cable reel 20, such as the rewinding device discussed below or other devices that can receive the shaft coupling 28, such as a crank, a power winch, or a drill. The cable reel 20 can be rewound simultaneously with retrieving the anchor and submerged instrument. For example, once the underwater retrieval device 10 is in the unlocked configuration and the buoyancy means has forced the underwater retrieval device 10 to the surface, the cable reel 20 can be coupled to a rewinding device, such as the rewinding device discussed herein, and the submerged instrument and anchor can be pulled to the surface simultaneously while rewinding the cable reel 20 for a second deployment. In other embodiments, the submerged instrument and anchor can be pulled to the surface first and then the shaft coupling 28 can be coupled to a rewinding device to rewind the cable reel 20. In order to facilitate the rewinding of the cable reel 20, the shaft coupling 28 can be accessible from outside of the housing 60. For example, the shaft coupling 28 can extend outside the housing 60 or the housing 60 can have an opening large enough to receive a rotating coupler of the rewinding device.

The outer frame or housing 60 should be sized and shaped to hold the cable reel 20 with the cable 21 wrapped around an outside thereof such that the cable reel 20 can freely rotate when in the unlocked configuration. In some configurations, bushings can be placed on either side of the cable reel 20 shaft to improve the efficiency of the rotation of the cable reel 20 when the underwater retrieval device 10 is in the unlocked configuration, both for efficient unwinding and rewinding of the cable reel 20.

In some embodiments, the housing 60 is configured as an outer frame and the cable reel 20 is configured as an inner frame rotatably mounted within the outer frame, such that, when in an unlocked configuration, the cable reel 20 (inner frame) can freely rotate to wind or unwind a cable while the housing 60 (outer frame) retains its position. In some embodiments, the housing 60 is configured to provide an open or closed frame entirely around the cable reel 20, such that when the cable reel 20 is being rewound, the weight of the cable reel 20 and the cable is supported by the housing 60, allowing for a more efficient rewinding. In other embodiments, the housing 60 can be open on a top end thereof, while providing a base to support for the cable reel 20. In other words, when the underwater retrieval device 10 is in a rewinder, the base would abut a surface of the rewinder to support the weight of the cable reel 20.

In some embodiments, the housing 60 can be any shape that retains the inner frame (cable reel 20) inside, such as an open or closed cube, cuboid, sphere, tetrahedron, triangular prism, pentagonal prism, hexagonal prism, etc. The housing 60 can comprise an open frame that allows the water to pass through the housing 60 easily when the underwater retrieval device 10 is rising to the surface. An open or partially open housing 60 can result in less turbulence when the underwater retrieval device 10 is rising to the surface. In other embodiments, the housing 60 can be closed or substantially closed, such that the inner frame or cable reel 20 is not visible. In such examples, a closed housing 60 could include an opening for the cable to be threaded through and attach to the underwater instrument or anchor and an opening for receiving the locking mechanism 30 therethrough to engage with the cable reel 20.

In the exemplary embodiment, the locking mechanism 30 includes a locking pin 32, a locking lever 34, a lock 36 operatively connected to a release mechanism 40, and a biasing means 38. In some embodiments, the locking pin 32 is engageable with the cable reel 20, such as through one of the apertures 26 on the flange 24, to prevent the rotation of the cable reel 20 when in the locked configuration. The locking pin 32 is coupled to the locking lever 34, which is configured to move the locking pin 32 from the locked configuration to the unlocked configuration. The locking lever 34 is coupled to the lock 36, which holds the locking lever 34 in the locked configuration until the lock 36 is released. In some embodiments, which will be explained in further detail below, the locking lever 34 can be coupled to the lock 36 with a corrodible, temporary link, thus providing a redundant release mechanism. The locking lever 34 is biased away from the housing 60 or the cable reel 20 via biasing means 38, such that when the lock 36 is released, or when the locking lever 34 is released from the lock 36, the locking lever 34 is moved into the unlocked configuration. The locking lever 34 can be pivotally attached to a frame or housing 60, thus allowing the locking lever 34 to pivot between the unlocked configuration (FIG. 1) and the locked configuration (FIG. 2).

In other embodiments, the locking mechanism can be any configuration that can engage with the inner frame or cable reel 20 to prevent a rotation thereof and disengage with the inner frame or cable reel 20 in response to an external signal. For example, in the exemplary embodiment, the locking pin 32 is coupled to the locking lever 34, which is pivotally coupled to the housing 60. The locking pin 32 is configured to disengage with the cable reel 20 based on the pivotal motion of the locking lever 34. However, in other arrangements, the locking pin 32 can be arranged to move in other directions, such as axially with relation to the cable reel 20, to engage and disengage with the cable reel 20. In other embodiments, the locking mechanism can include a clamp or other known engagement means configured to engage with a portion of the cable reel 20 or the cable 21. For example, a rope clamp or clip could be used to prevent/allow the movement of the cable 21, and thus the unwinding of the cable reel 20.

In some embodiments, the lock 36 is a magnetic lock comprising a ferromagnetic element 37a configured to magnetically couple to a magnet 37b when in the locked configuration. The ferromagnetic element 37a is coupled to the locking lever 34 and the magnetic 37b is coupled to cable reel 20 in the hollow core 22 of the cable reel 20. When the locking mechanism 30 is in the locked configuration, the magnetic coupling between the ferromagnetic element 37a and the magnet 37b holds the locking lever 34 securely against the housing 60, thus retaining the locking pin 32 in the aperture 26 and preventing the cable reel 20 from unwinding the cable 21. When the lock 36 is released or unlocked, the biasing means 38 pushes the locking lever 34 away from the cable reel 20, thus removing the locking pin 32 from the aperture 26 and allowing the cable reel 20 to unwind the cable 21. It is to be understood that when the underwater retrieval device 10 is in the locked configuration, the biasing means 38 is applying a force against the locking lever 34, which is held securely against the housing 60 by the lock 36. Thus, the strength of the lock 36 should be sufficient to hold the locking lever 34 in place against the biasing means 38.

Consideration of the length of the locking lever arm 34 and the magnetic pull of the magnet 37b, should be given when determining the strength of the biasing means 38. The biasing means 38 must have a sufficiently force to move the locking lever 34 enough to remove the locking pin 32 from the aperture 26. Consideration of the pressure on the locking pin from torque related to the cable reel 20 being pulled in the upwards direction (i.e., toward the water surface) should also be given when determining the strength of the biasing means 38. The torque force on the cable reel 20 is related to the buoyant force applied on the underwater retrieval device 10, which is determined by the buoyancy means. In some embodiments, the biasing means 38 can be a spring. The biasing means 38 can be located between the locking lever 34 and the housing 60. In some embodiments, the biasing means 38 can be provided as a spring around the locking pin 32. In other embodiments, the biasing means 38 can be adjacent to the locking pin 32 or adjacent to a pivot axis of the locking lever 34. For example, the biasing means 38 can be a hinge spring at the pivot point of the housing and the locking lever. In some embodiments, the biasing means 38 can be chosen to open the locking lever 34 in an environment with a pressure of at least 360 psi.

The locking mechanism 30 can be unlocked or released by the release mechanism 40. The release mechanism 40 can be coupled to or located adjacent to the lock 36. When the release mechanism 40 receives an unlocking signal from the controller 50, the release mechanism 40 releases or unlocks the lock 36 to move the locking mechanism from a locked configuration (as shown in FIG. 1) to an unlocked configuration (as shown in FIG. 2). In some embodiments, the release mechanism 40 can be an electro-magnetic coil that creates a magnetic field to neutralize the magnetic flux of the magnet 37b. In this embodiment, the magnet 37b is an electropermanent magnet and the ferromagnetic element 37a is a ferromagnetic material, such as iron, cobalt, nickel, etc. In some implementations, the ferromagnetic material is magnetic stainless steel.

It is to be understood that the magnet 37b can be coupled to the locking lever 34 and the releasing mechanism 40 can be positioned in the locking lever 34 to neutralize the magnetic flux of the magnet 37b. In this embodiment, the ferromagnetic element 37a is coupled to the cable reel 20 in the hollow core 22 of the cable reel 20. When the magnetic flux of the magnet 37b of the lock 36 is neutralized, the biasing means 38 pivots the locking lever 34 away from the cable reel 20, thus removing the locking pin 32 from the aperture 26 on the cable reel 20 and placing the cable reel 20 in an unlocked configuration. To facilitate the on-demand recall of the underwater retrieval device 10, the release mechanism 40 is in electronic/data communication with the controller 50 (or operatively connected to the controller 50), which receives the external signal from the surface. Once the cable reel 20 is in an unlocked configuration, the buoyancy means provides a positive flotation force on the underwater retrieval device 10, thus permitting the underwater retrieval device 10 to float to the surface for retrieval. As the underwater retrieval device 10 travels towards the surface of the body of water, the cable 21 unwinds from the cable reel 20.

In some embodiments, the controller 50 can comprise a transducer configured to receive an external signal from the surface, such as from a boat unit or rewinding device on the boat retrieving the underwater instrument. For example, the controller 50 can be an electroacoustic transducer configured to receive an encoded acoustic signal from a specific radius, for example, a radius of at least 1 km. As described above, other types of signals that are capable of traveling through water can also be used. In some embodiments, part or all of the controller 50 is integrated in the outer frame or housing 60. In other embodiments, the signal receiver portion of the controller 50 can be located in the outer frame or housing 60 and the remaining portions of the controller 50 can be located in a hermetic capsule, such as in the hollow core 22 of the cable reel 20, to protect the electronic components.

When the controller 50 receives the external signal, the controller 50 is configured to send an unlocking signal to the release mechanism 40 to move the locking mechanism 30 from the locked configuration to the unlocked configuration. In some embodiments, the controller 50 can be configured for bi-directional communication with the surface of the water. For example, the controller 50 can include a Global Positioning System (GPS) and be configured to send a signal with the exact location of the underwater retrieval device 10. This feature can be useful in the event that the underwater instrument has moved, such as due to currents or other underwater forces, or in the event that the coordinates for the sinking point have been lost. This GPS data can also be uploaded to a cloud platform accessible by interested organizations, such as government or non-governmental organizations (NGOs) that monitor the body of water, fisheries, scientific organizations, etc.

The underwater retrieval device 10 can further comprise an eye hook, carabiner, or other attachment means to couple the underwater retrieval device 10 to an external buoy to provide buoyancy means. The buoyancy means allows the underwater retrieval device 10 to return to the surface of the body of water when in the unlocked configuration. In some embodiments, the underwater retrieval device 10 can include a frame or housing 60 that has buoyancy and thus functions as the buoyancy means. In some embodiments, the buoyancy in the frame or housing 60 is provided such that the cable reel 20 is retained in a horizontal position while underwater. In other embodiments, the buoyancy means can be coupled to the housing 60 to retain the cable reel 20 in a horizontal position while underwater, such as coupling the buoyancy means to each corner or each side of a top of the housing 60, such that the housing 60 does not twist or turn when ascending to the surface in the unlocked configuration. A horizontal cable reel 20 facilitates easier and more efficient unwinding of the cable reel 20 when the underwater retrieval device 10 is placed in the unlocked configuration, thus optimizing the time for the underwater retrieval device 10 to ascend to the surface. Furthermore, when the cable reel 20 unwinds in a substantially horizontal orientation, the cable is unwound without rotating around the cable reel 20, thus avoiding the development of rope knots or loops, which can impede the underwater retrieval device 10 from reaching the surface.

The underwater retrieval device 10 can also include secondary or redundant release mechanisms. In some embodiments, the secondary release mechanism can be a time release system with a predetermined time inputted into the controller 50 via a user interface prior to deployment underwater. A time release system can be configured for the controller 50 to send an unlocking signal to the locking mechanism 30 to unlock the cable reel 20 after a predetermined set of time. A time release system provides a secondary option in the event of an issue with the controller receiving the external signal to unlock the underwater retrieval device 10.

In some embodiments, the underwater retrieval device 10 can include a redundant release mechanism 70, such as a corrodible temporary link that slowly erodes over time in the water, thus providing a redundant release once the link has been eliminated. A redundant release mechanism 70 can be a tertiary or redundant measure to release the locking mechanism 30 and place the underwater retrieval device in the unlocked configuration in the event of a failure of the controller 50 or the release mechanism 40, such as an electrical failure.

The redundant release mechanism 70 can be coupled at one end to the ferromagnetic material 37a and at the other end to the locking lever 34, thus creating a corrodible, temporary link between the lock 36 and the locking lever 34. If the release mechanism 40 does not receive an unlocking signal from the controller 50, or does not respond to an unlocking signal from the controller, when the redundant release mechanism 70 is eroded away, the biasing means 38 will push the locking lever 34 away from the lock 36 and the locking pin 32 will be removed from the cable reel 20, thus allowing the cable reel 20 to unwind.

In some embodiments, the redundant release mechanism 70 can be a galvanic timed release (GTR) connector, which has a specific release timeline. In some embodiments, the type of GTR temporary link to be used can be determined based on a number of factors, including, the water's salinity, temperature, and depth, and the desired failsafe release timeline required for retrieval of the instrument. In some embodiments, the GTR can be selected to have the temporary link severed after approximately 70 days, although it is understood that a GTR can be selected for any number of days up to and including 70 days, or more depending on the size and configuration of the GTR.

Referring now to FIG. 3, a partially transparent front view of the underwater retrieval device 10 is shown. The cable 21, shown in dash dotted lines, is wrapped around the outer barrel of the cable reel 20, shown in dashed lines. It is understood that the cable 21 can be any type of suitable retrieval line used in the retrieval of the underwater instrument, such as rope, cable, string, or fishing line. The cable 21 should have a strength and diameter that is sufficient to withstand the buoyant force 80 as well as the pressures of the body of water, such as current. The cable reel 20 can be designed to hold any length or diameter of cable 21. For example, in some embodiments, the cable reel 20 can be designed to hold 250 meters of 16 mm rope. Other embodiments used for shallower depths can have a cable reel 20 designed to hold 100 m of 16 mm rope. It is understood that any number of lengths or sizes of cable or rope can be used with the underwater retrieval device 10. Consideration of the cable length and size should be given when determining the size and configuration of the frame 60, such that the frame 60 does not impede the unwinding of the cable reel 20.

At a first end, the cable 21 is coupled to the cable reel 20 or the housing 60. At a second end thereof, the cable 21 can have an end, such as an eye hook, carabiner, or other attachment means 23, to attach to an anchor and/or the underwater instrument being deployed. In other embodiments, the cable 21 can be attached to a buoyancy means, such that when in the unlocked configuration, only the buoyancy means returns to the surface. However, such an embodiment would not allow for a rewinding of the cable reel 20 simultaneously with retrieval of the underwater instrument. The housing 60 has an opening or slot at a bottom thereof for the second end of the cable 21 and the attachment means 23 to extend therethrough. The opening or slot should be of sufficient size and shape to allow the cable 21 to freely exit the housing 60 when the upward buoyant force 80 is exerted on the housing 60 after the submerged underwater retrieval device 10 is placed in the unlocked configuration.

FIG. 3 shows the underwater retrieval device 10 in a locked configuration. The lock (not shown) is engaged such that the locking lever 34 is abutted against the housing and the locking pin 32 is in an aperture 26 of the cable reel 20, thus preventing the cable reel 20 from freely rotating. The buoyancy means in the housing 60 is such that the cable reel 20 is held in a horizontal orientation while submerged, thus facilitating easier unwinding of the cable reel 20 when the underwater retrieval device is placed in the unlocked configuration.

The underwater retrieval device 10 can be stored in the locked or unlocked configuration. When the lock 36 is a magnetic lock, the underwater retrieval device 10 can be stored in the locked or unlocked configuration without any addition power consumption. To use the underwater retrieval device 10, the user winds the cable 21 around the cable reel 20 and loads or arms the device by pushing the locking lever 34 to engage the lock 36 (i.e., when the lock 36 is a magnetic lock, engaging the lock comprises magnetically coupling the ferromagnetic material 37a and the magnet 37b) and to engage the locking pin 32 with the cable reel 20. The controller 50 can be programed to have a specific release time and/or be programmed to receive an external signal to move the cable reel 20 into the unlocked configuration. Once affixed to the underwater instrument and/or an anchor, the underwater retrieval device 10 can be deployed in the water.

When the user is ready to retrieve the underwater instrument, an external signal can be sent from a boat unit or rewinding device to the controller 50. If the external signal matches the underwater retrieval device 10, the controller sends an unlocking signal to the release mechanism 40, which creates a magnetic field to briefly neutralize the magnet 37b, thus magnetically decoupling the ferromagnetic material 37a and the magnet 37b. This magnetic decoupling allows the biasing means 38 to push the locking lever 34 away from the housing 60, thus removing the locking pin 36 from the aperture 26 in the cable reel 20. In the event of a signal failure, where the external signal does not reach the controller 50, the controller 50 will send the unlocking signal to the release mechanism 40 after the predetermined amount of time. In the event of an electrical failure, where the controller 50 is unable to send a signal to the release mechanism 40 or the release mechanism is unable to release the lock 36, the redundant release mechanism 70 will erode the link between the ferromagnetic material 37a and the locking lever 34, thus allowing the biasing means 38 to push the locking lever 34 into the unlocked configuration, while the ferromagnetic material 37a remains magnetically coupled to the magnet 37b.

Once in the unlocked configuration, the positive buoyant force of the housing 60 or other buoyancy means attached to the housing 60 then lifts the underwater retrieval device 10 to the surface, thus extending the cable from the underwater instrument on the bed of the body of water to the water surface. Once the underwater retrieval device 10 is retrieved, the user can couple a re-reeling device, such as a power winch or rewinding device, to the shaft coupling 28 on the cable reel 20 and simultaneously rewind the cable reel 20 and retrieve the submerged instrument. The rewinding device can be included with the boat unit that is configured to send the external signal. When a redundant release mechanism 70 is being used, the redundant release mechanism 70 can be replaced and the underwater retrieval device 10 can be redeployed for subsequence use.

Referring now to FIGS. 4 to 8, an underwater retrieval device 110 according to another embodiment is shown in a locked configuration. The underwater retrieval device 110 comprises a cable reel 120, a locking mechanism 130, a release mechanism (not shown), a controller 150, and housing 160 configured to provide buoyancy means.

Figure 9:
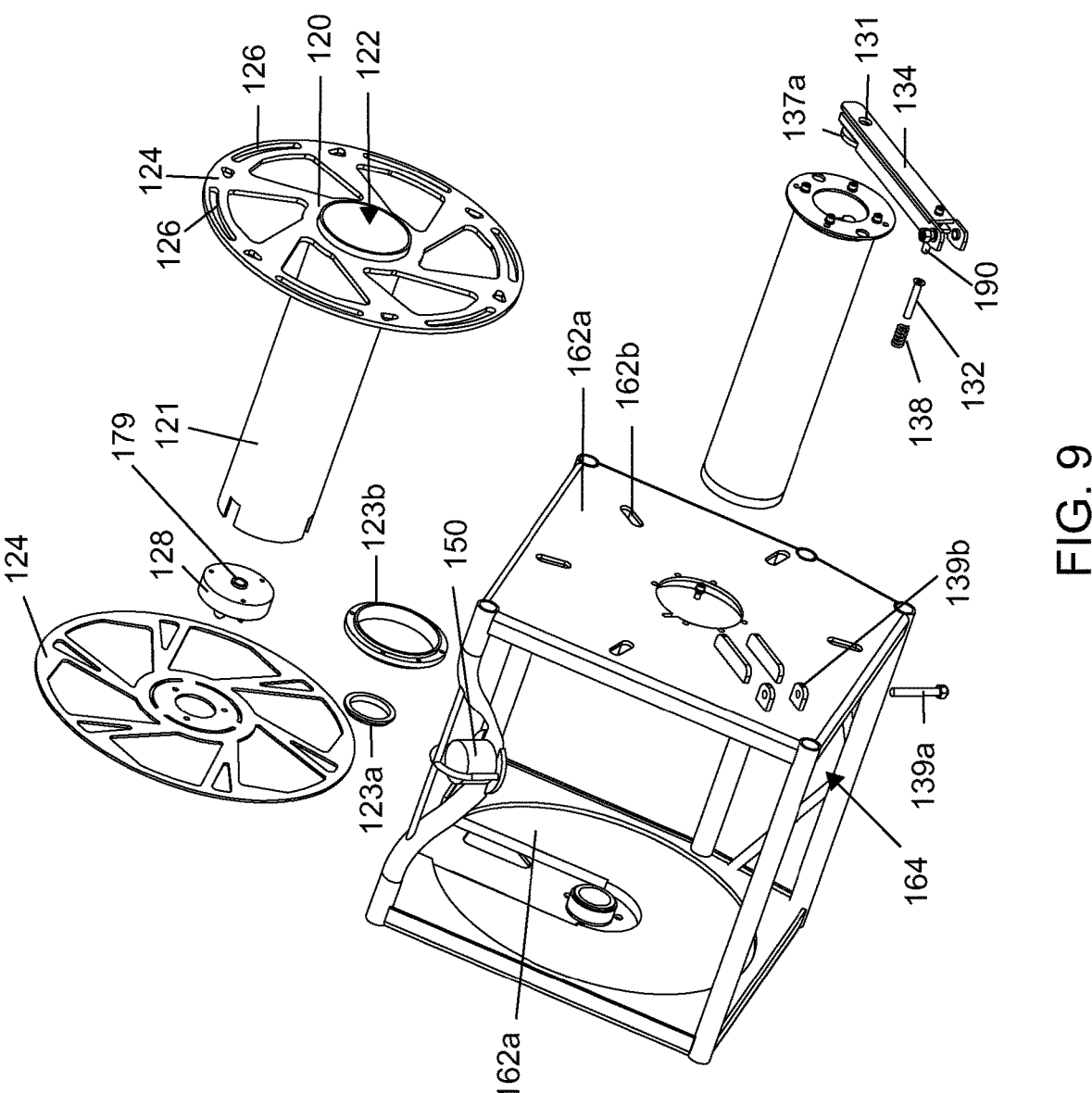
FIG. 9 is an exploded perspective view of the underwater retrieval device shown in FIG. 4.
Figures 12A, 12B, 12C, 12D, 12E:
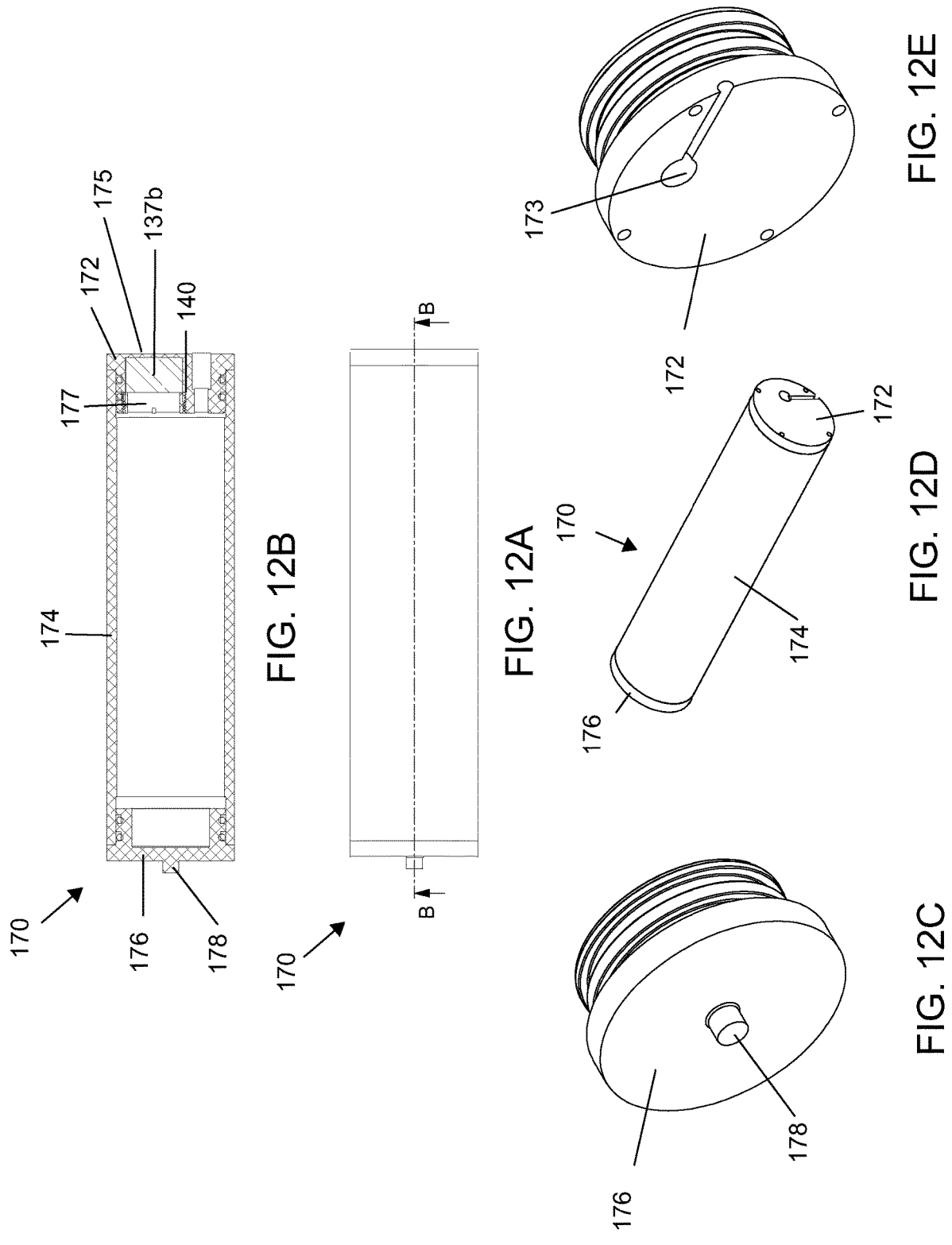
FIG. 12A is a side plan view of a capsule for use with the underwater retrieval device shown in FIG. 4, the capsule including a body, a braking cover, and a pivoting cover.
FIG. 12B is a cross sectional view of the capsule shown in FIG. 12A taken along lines B-B.
FIG. 12C is an enlarged perspective side view of the pivoting cover shown on the capsule in FIG. 12A.
FIG. 12D is a perspective side view of the capsule shown in FIG. 12A.
FIG. 12E is an enlarged perspective side view of the braking cover shown on the capsule in FIG. 12A.

The cable reel 120 comprises a barrel 121 with a hollow core 122, the barrel 121 being configured to receive a cable wrapped around an outside thereof, and flanges 124 on the distal ends of the barrel 121. The flanges have apertures 126 that are configured to receive the locking mechanism 130 to secure the cable reel 120 in a locked configuration. At a first end of the barrel 121, the flange 124 has an opening to receive a capsule 170 (as shown in FIGS. 12A and 12B) inside the hollow core 122, as shown in FIG. 9. The capsule 170 can be a hermetic capsule to retain the electronic components of the release mechanism and/or the controller. The capsule 170 is configured to fit inside the hollow core 122 and rotate therewith. At a second end of the barrel, opposite the first end, is a shaft coupling 128 configured to couple to a rewinding device, such as a power winch. It is to be understood that the cable reel 120 is fitted within the housing 160 such that the cable reel 120 can freely rotate when the locking mechanism 130 is in the unlocked configuration. In some embodiments, the cable reel 120 can include slide bearings 123a or 123b between the cable reel 120 and the housing 160 to further facilitate rotation of the cable reel 120 when the underwater retrieval device 110 is in the unlocked configuration (i.e., during unwinding or rewinding of the cable reel 120).

The locking mechanism 130 comprises a locking lever 134 that is pivotally attached to the housing 160 at a first end 135a and coupled to a magnetic lock at a second end 135b. The magnetic lock comprises a ferromagnetic material 137a magnetically coupled to a magnet 137b when in the locked configuration. The ferromagnetic material 137a is coupled to the locking lever 134 and the magnet 137b is housed in the capsule 170. In some embodiments, the locking lever 34 has a connection point 131 to temporary couple the locking lever 134 to the ferromagnetic material 137a with a corrodible, temporary link, such as with a GTR connector. The second end of the locking lever 134 is biased away from the housing 160 or the cable reel 120 such that when the locking lever 134 is disconnected from the magnetic lock or when the magnetic lock has magnetically decoupled, the locking lever 134 pivots away from the housing 160. The locking lever 134 can be biased away from the housing 160 or cable reel 120 via a biasing means 138, such as a spring. The biasing means 138 is provided around the locking pin 132 to provide the biasing force around the locking pin 132, causing the locking pin 132 to disengage from the cable reel 120. In some embodiments, the biasing means 138 can be coupled to the locking lever 134 near the first end 135a or the second end 135b, provided that the biasing means 138 has sufficient strength to disengage the locking mechanism 130 from the cable reel 120. In the embodiment shown in FIGS. 4 to 9, the locking mechanism is engaged with the cable reel 120 via the locking pin 132 that is coupled to the locking lever 134 near the first end (i.e., near the pivoting axis of the locking lever 134). When the magnetic lock is magnetically coupled, the ferromagnetic material 137a prevents the locking lever 134 from pivoting away from the housing 160. In this locked configuration, the locking pin 132 is engaged with the cable reel 120 through a housing aperture 161 in the housing 160 and through one of the apertures 126 on the flange 124 of the cable reel 120. Thus, the locking pin 132 prevents the cable reel 120 from rotating when the locking lever 134 is abutted against the housing 160.

It is to be understood that the locking lever 134 can be coupled to the housing 160 or engaged with the cable reel 120 in other manners that facilitates a locked configuration (i.e., engaging with the cable reel 120 to brake or prevent the cable reel 120 from freely rotating) and an unlocked configuration (i.e., disengaging with the cable reel 120 to allow the cable reel 120 to freely rotate). For example, the locking lever 134 can engage with the barrel 121 of the cable reel 120 via a lock, such as a magnetic lock, at one end and be pivotally attached to the housing 160 at another end, such that when the locking lever 134 is engaged with the barrel 121 (i.e., the locked configuration), the cable reel 120 is prevented from rotating.

The housing 160 can comprise buoyancy means to provide a positive flotation force on the underwater retrieval device 110 when submerged. The buoyancy means can be buoyant panels 162*a*, which can comprise holes 162*b* to allow water to flow through the buoyant panels 162*a* when the cable reel 120 is unwinding, as well as when the underwater retrieval device 110 is being rewound above the surface of the water. When the underwater retrieval device 110 is in the unlocked configuration, the buoyant panels 162*a* allows the device 110 to return to the water surface. In some embodiments, the buoyant panels 162*a* can be rotationally molded panels that are filled with a buoyant substance, such as foam.

Alternatively, as noted herein, it is understood that the housing 160 can be coupled to a buoyancy means, such as a buoy, to provide a positive buoyancy force on the underwater retrieval device 110, allowing the cable reel 120 to unwind as the device 110 ascends to the surface. The housing 160 can also comprise an opening 164 for the cable to be threaded through to attach to the underwater instrument or anchor. The opening 164 can include a roll bar 166 to provide a smooth surface for the cable to unwind against and prevent erosion of the cable. In some embodiments, such as the one shown in FIGS. 4 to 8, the housing 160 is open on a first and second side thereof, with the housing 160 primarily being on the front side and back side (i.e., the sides adjacent to the flanges 124 of the cable reel 120). However, it is understood that different shapes and configurations of a housing 160 are possible.

Figures 10A, 10B, 10C:
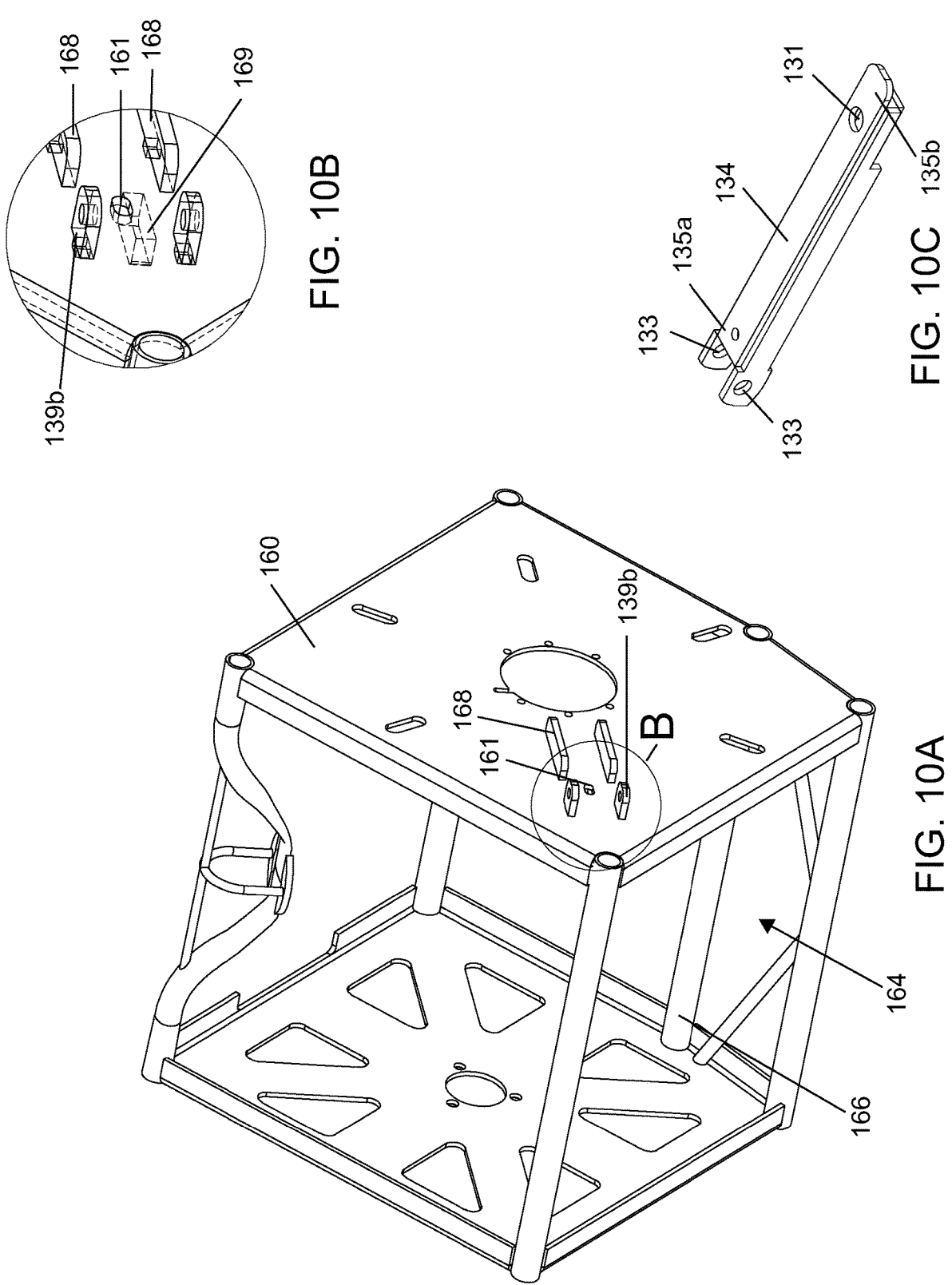
FIG. 10A is a partial perspective front view of a housing of the underwater retrieval device shown in FIG. 4.
FIG. 10B is an enlarged view of portion B shown in FIG. 10A.
FIG. 10C is a perspective side view of a locking lever for coupling to the housing shown in FIG. 10A.

Referring now to FIGS. 9 to 10C, an enlarged view of the housing 160 at the coupling point of the locking lever 134 can be seen. The housing includes a housing aperture 161 to allow the locking pin 132 to extend therethrough and into an aperture 126 on the cable reel 120. The locking lever 134 can be pivotally coupled to the housing 160 via an axis pin 139*a* and hinge plates 139*b*. The axis pin 139*a* runs the length between the hinge plates 139*b* and through corresponding openings 133 on the first end 135*a* of the locking lever 134, creating a pivot axis. The housing can further comprise guide rails 168 to prevent the locking lever 134 from twisting or moving when in the locked configuration. When submerged in the locked configured, the locking pin 132 can have considerable pressure exerted on the sides of the locking pin 132 from the torque of the cable reel 20. Therefore, the housing 160 can also include a pin guide 169 adjacent to the housing aperture 161 on an interior side of the housing 160 to guide the locking pin 132 and provide reinforcement against the locking pin 132. In some embodiments, the locking pin 132 can be a stainless-steel screw that can be threadedly attached to a pin housing 190, configured to have corresponding internal threading to receive the locking pin 132. In some embodiments, the pin housing 190 can be comprised of a polyoxymethylene plastic to reduce the friction coefficient between the aperture 126 on the cable reel 120 and the locking pin 132. Furthermore, in some embodiments, the cable reel 120 is comprised of aluminum. Accordingly, the pin housing 190 can prevent an unwanted galvanic coupling between the aluminum flange 124 and the stainless-steel locking pin 132. The locking pin 132 can further be designed to enable breakage when the torque on the locking pin 132 reaches or exceeds a predetermined force. Thus, if the locking pin 132 breaks under a large torque force (for example, from something pulling on the underwater retrieval device 10), the cable reel 120 will move into the unlocked configuration.

Referring now to FIGS. 11A to 11E, various views of the cable reel 120 are shown. As can be seen, at least one of the flanges 124 has apertures 126 for receiving the locking pin 132. The flanges 124 can be removably coupled to the cable reel 120 via barrel protrusions 180 on the barrel 121 that fit into corresponding apertures 181 on the flange 124.

Referring now to FIGS. 12A to 12E, a capsule 170 configured to fit in the hollow core 122 of the cable reel 120 is shown. In some embodiments, the magnet 137*b* can be in a braking cover 172 of the capsule 170. The braking cover 172 can comprise a ball nose 173 or other cavity for securing a cable between the controller 150 and the release mechanism 140, which in this embodiment is an electromagnetic coil. In this embodiment, the magnet 137*b* is an electropermanent magnet, which can be neutralized temporarily by the release mechanism 140 when an unlocking signal is received from the controller 150. Thus, the braking cover 172 houses the release mechanism 140 and a portion of the lock to facilitate the coupling and decoupling of the lock to move the underwater retrieval device 110 from the locked configuration to the unlocked configuration. The outer side wall 175 of the braking cover 172 can be provided as a thin wall to maximize the magnetic attraction between the magnet 137*b* in the braking cover 172 and the ferromagnetic material 137*a* on the outside of the braking cover 172. In some embodiments, the electromagnetic coil 140 can be located adjacent to a retaining ring 177, such as threads, that secures the electromagnetic coil 140 and the magnet 137*a* tightly against the wall 175 to prevent the water pressure from breaking the wall 175.

The braking cover 172 can be removably coupled to the body 174 of the capsule 170 to allow maintenance on the lock and/or release mechanism 140. The capsule 170 can also include a removable pivoting cover 176 at an opposing end of the body 174. The pivoting cover 176 can be provided with a protrusion 178 to fit in a corresponding socket 179 on the interior side of the shaft coupling 128 (shown in FIG. 9). The body 174 can be configured as a hermetic capsule to retain the electronic and power components of the underwater retrieval device 110.

Figure 13:
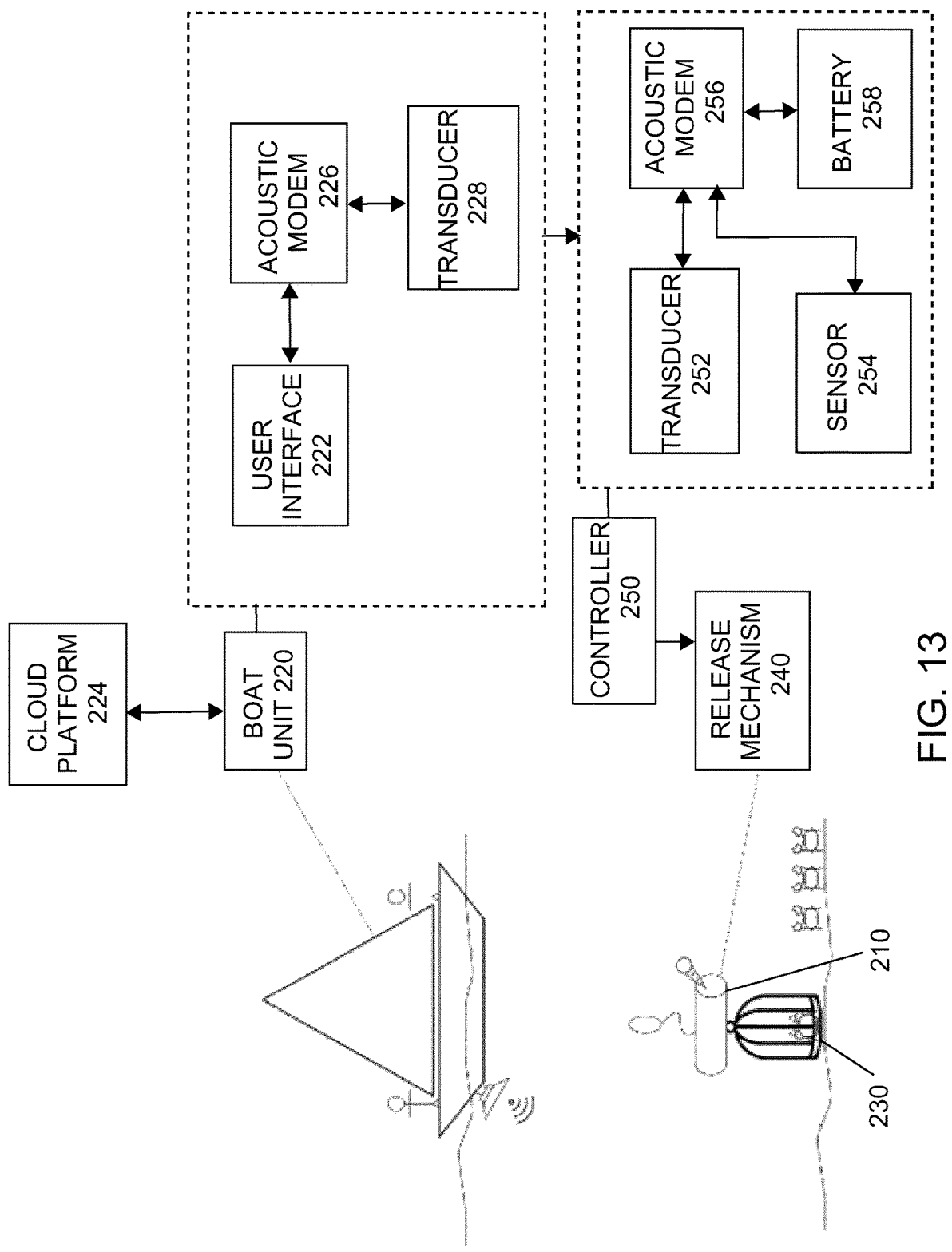
FIG. 13 is a schematic view of an underwater retrieval system, including the components of the boat unit and the components of an underwater retrieval device according to another embodiment.

Referring now to FIG. 13, an underwater retrieval device 210 can be deployed from a boat with a boat unit 220. The user ensures that the cable is long enough for the desired depth, and engages the lock or brake on the cable reel by magnetically coupling the lock. The underwater retrieval device 210 can be coupled to the underwater instrument 230 being deployed, such as a crab cage, and both are launched into the water. The boat unit 220 can record pertinent operation data, such as a unique identification code of the underwater retrieval device 210, a GPS location of the launch point, the type of underwater instrument being deployed, and/or the time of the launch. The boat unit 220 can record this information via short-range communication, thus, allowing the boat unit 220 to record the launch data and upload the data to the user interface 222 without access to a network. Once the boat unit 220 is connected to a network, the launch data can be uploaded to a cloud platform 224. The cloud platform 224 can be enabled to share GPS launch data with other authorized users, for example when the users are within a predetermined distance from the launched underwater retrieval device 210. For example, if the underwater retrieval device 210 is deployed with a crab cage, the cloud platform 224 can inform another fisherman of the presence of the buoy when they are within a specific distance of the underwater retrieval device 210 via the user interface 222 of their boat unit 220. However, as described herein, the external signal used to activate or unlock the underwater retrieval device 210 can be encoded, such that only the original boat unit 220 or an authorized boat unit 220 with the unique identification code that launched the device 210 can communicate with the controller 250 to release the cable reel and allow the underwater retrieval device 210 to float to the surface. The GPS data uploaded to the cloud platform 224 allows other users to know where other underwater instruments have been deployed. For example, when used with underwater fishing instruments, such as crab cages, the GPS data uploaded to the cloud platform 224 can show other fishermen where the fishing instruments are deployed to avoid overfishing in a specific area. The operation data uploaded to the cloud platform 224 can also be shared with other organizations, such as governmental departments or NGOs monitoring the body of water to provide additional data as to where underwater instruments 230 are deployed at any given time.

To retrieve the underwater retrieval device 210, the user can use the user interface 222 on the boat unit 220 to send an external signal to the controller 250 via an acoustic modem 226 and transducer 228. The external signal can be specific to the unique identification code of the underwater retrieval device 210. For example, the external signal can be a unique or encoded acoustic code.

The underwater retrieval device 210 includes a release mechanism 240 and controller 250 configured to receive the external signal. The controller 250 can include a transducer 252, a signal sensor 254, a second acoustic modem 256, and a battery 258. The external signal sent by the acoustic modem 226 on the boat unit 220 is received by the sensor 254 in the underwater retrieval device 210. The sensor 254 can be any device capable of receiving an external signal. In some embodiments, when the external signal is an acoustic signal, the sensor 254 can be a hydrophone. The second acoustic modem 256 in the controller 250 of the underwater retrieval device 210 converts the acoustic signal into digital data, which is then sent to the transducer 252. If the external signal matches the unique identification code of the underwater retrieval device 210, the transducer 252 sends an unlocking signal to the release mechanism 240. The release mechanism 240 then unlocks the locking mechanism, thus placing the underwater retrieval device 210 in the unlocked configuration. For example, the release mechanism 240 may be an electromagnetic coil that temporarily neutralizes the magnetic flux of the magnetic lock, thus releasing the locking lever, which is biased away from the inner frame and/or outer frame such that the release of the lock results in the underwater retrieval device 210 moving to the unlocked configuration. However, other configurations of a release mechanism 240 are also possible.

The controller 250 is powered by a battery 258. The controller 250 requires very little power to operate; as such, the battery 258 can be chosen to optimize cost and energy consumption. In some embodiments, the battery 258 can be chosen to last up to 10 operational seasons (approximately 16,800 hours or 700 releases).

In some embodiments, secondary sensors, which can be in the controller 250, can be used to monitor the underwater retrieval device 210 and communicate information back to the boat unit 220. The data can then be displayed to the user with the user interface 222. For example, secondary sensors can include a battery monitor, water ingress monitor, a pressure sensor, and/or an inertial measurement unit (IMU). Thus, the underwater retrieval device 210 can be used to monitor the power level on the battery 258, whether water has infiltrated the hermetic capsule, the pressure on or inside the underwater retrieval device 210 and/or the specific force, angular rate and/or orientation of the underwater retrieval device 210 during its underwater use. The data from the secondary sensors can be transferred via short-wave wireless technology, such as Bluetooth™, to the boat unit 220 and/or the cloud platform 224 when the underwater retrieval device 210 is retrieved from the water. Alternatively, the data from the secondary sensors can be communicated to the boat unit 220 and/or the cloud platform 224 via long-range communication methods during the underwater retrieval device's 210 underwater deployment.

Figure 14:
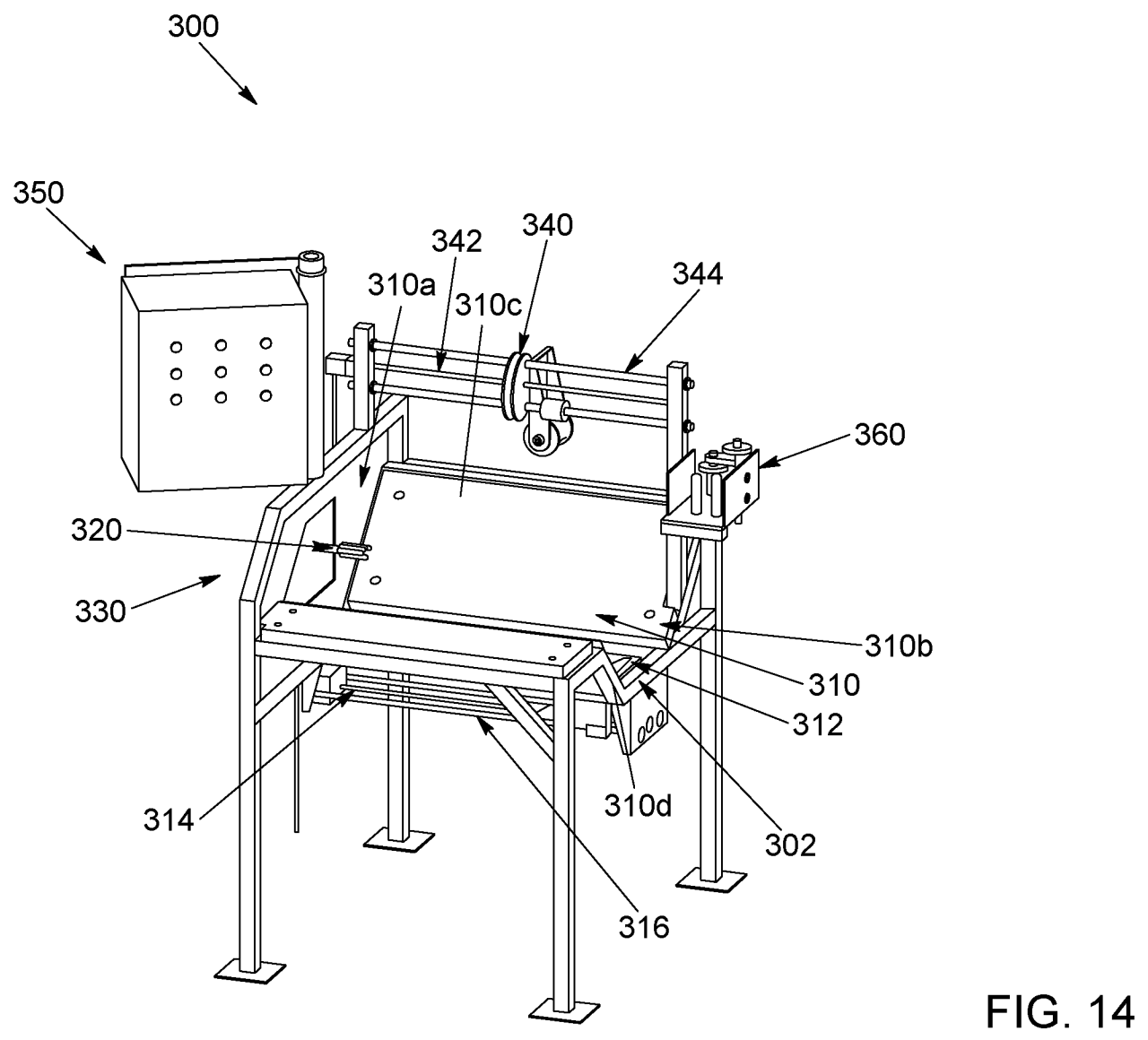

Referring now to FIG. 14, a rewinding device 300 according to one embodiment is shown. The rewinding device 300 is configured to engage with and rewind an underwater retrieval device for subsequent use, such as the ones described herein. Accordingly, there is provided an underwater retrieval system that includes the underwater retrieval devices described herein and the rewinding device 300. In some embodiments, the rewinding device 300 is configured to rewind an underwater retrieval device that comprises an outer frame and an inner frame, rotatable inside the outer frame.

The rewinding device 300 comprises a frame or housing 302 with an underwater retrieval device receiving section 310 extending between a first end 310a and a second end 310b, a rotatable coupler 320 configured to engage with a shaft coupler (such as shafter coupler 28, 128) on an underwater retrieval device, and an actuating means 330, such as an electric motor, configured to rotate the rotatable coupler 320.

In the exemplary embodiment, adjacent to the first end 310a, the rewinding device 300 includes the rotatable coupler 320. In some embodiments, the second end 310b of the underwater retrieval device receiving section 310 of the housing 302 is horizontally translatable (i.e., adjustable in the horizontal direction) to secure different sizes of underwater retrieval devices. In the exemplary embodiment, the second end 310b includes a clamp 312 that is horizontally translatable along a clamp endless screw 314 and clamping rods 316 disposed underneath the underwater retrieval device receiving section 310, such that the rewinding device 300 can adjust to a length of the outer frame of the underwater retrieval device. When actuated, for example by the actuating means 330, the clamp 312 moves horizontally inwardly towards the first end 310a until the clamp 312 engages with and secures a side of the outer frame of the underwater retrieval device. The clamp 312 is then engaged with the outer frame of the underwater retrieval device to secure the underwater retrieval device such that the rotatable coupler 320 can engage and remain engaged with the shaft coupler of the inner frame of the underwater retrieval device.

In other embodiments, the clamp 312 can be horizontally translatable by manual means, such as via a crank and endless screw or by being slidably engaged with the housing 302 and being configured to lock when adjusted to the right distance from the first end 310a.

In some embodiments, the housing 302 includes side panels 310c, 310d that delimitate the underwater retrieval device receiving section 310 and are configured to hold the underwater retrieval device. In some embodiments, the underwater retrieval device receiving section 310 of the housing 302 can be substantially in a V-shape, such that the side panels 310c, 310d are angled toward each other and configured to receive a vertex of the outer frame of the underwater retrieval device. In other embodiments, the underwater retrieval device receiving section 310 can have a planar surface that is configured to receive a side wall of the outer frame of the underwater retrieval device. In some embodiments, a distance between the side panels 310c, 310d can be adjustable to fit a variety of sizes of underwater retrieval devices.

Figures 7, 8:
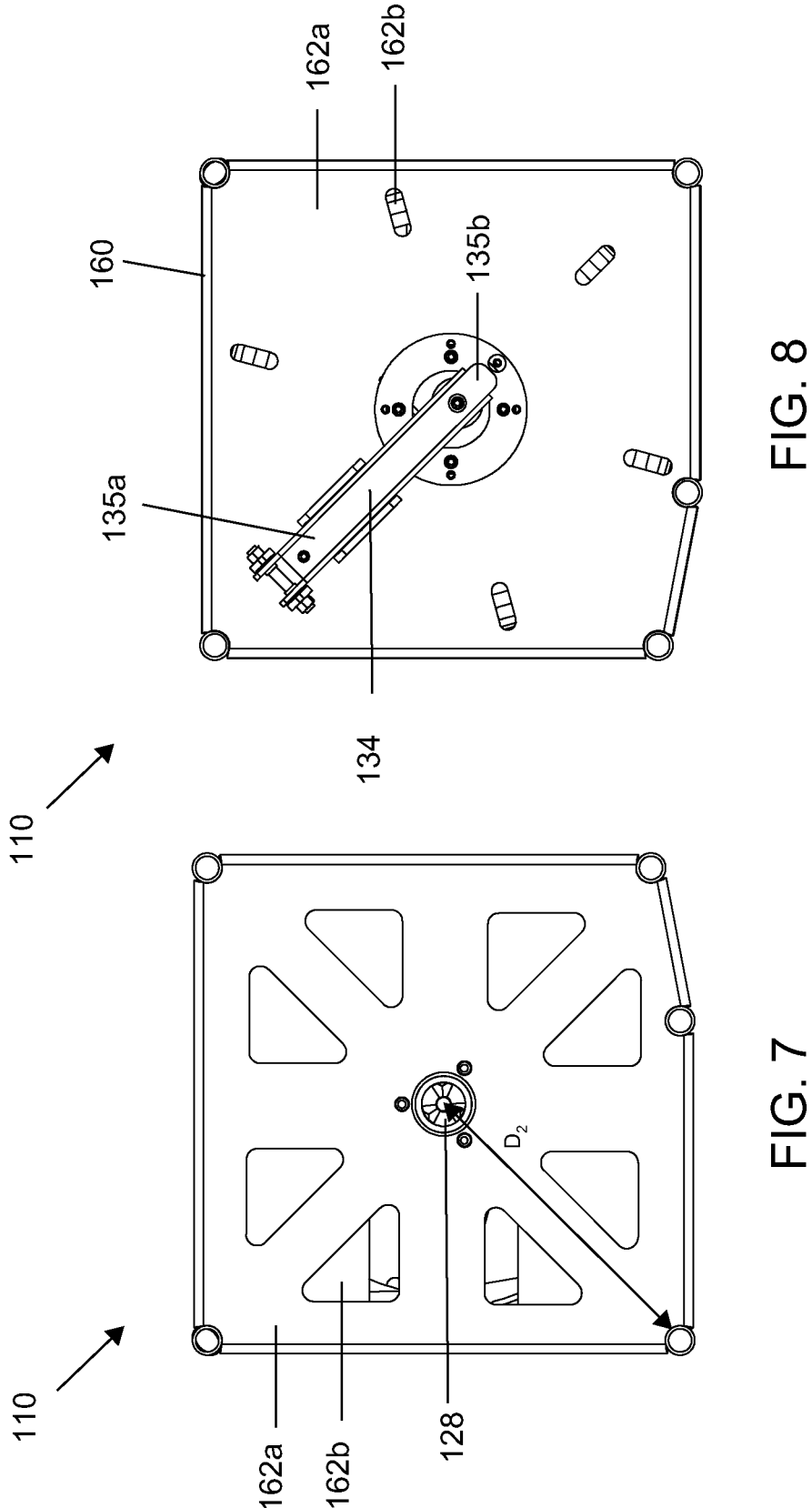
FIG. 7 is a back view of the underwater retrieval device shown in FIG. 4.
FIG. 8 is a front view of the underwater retrieval device shown in FIG. 4.

The rotatable coupler 320 is electronically coupled to the actuating means 330, such that, when activated, the actuating means 330 rotates the rotatable coupler 320. In some embodiments, the rotatable coupler 320 is adjustable in the vertical direction (i.e. vertically translatable such that the rotatable coupler 320 can move towards or away from the side panels 310c, 310d, which is the surface of the underwater retrieval device receiving section 310 that abuts the underwater retrieval device when in use). Vertical translation allows the rotatable coupler 320 to be adjusted to fit multiple sizes of underwater retrieval devices, such that the rotatable coupler 320 can be vertically adjusted to align with the shaft coupler on the underwater retrieval device (i.e., the rotatable coupler 320 adjusts to a height of the shaft coupler on the inner frame). In other embodiments, the rotatable coupler 320 can remain stationary and the underwater retrieval device receiving section 310 can be adjustable in the vertical direction (i.e., vertically translatable) to fit multiple sizes of underwater retrieval devices (i.e., adjust to a height of the shaft coupler on the inner frame). Referring back to FIG. 1, in some embodiments, the distance $D_1$ between the bottom of the housing 60 and a center of the shaft coupler 28 is what determines the distance between the surface of the underwater retrieval device receiving section 310 of the housing 302 that the frame 60 rests upon and the rotatable coupler 320. Referring now to FIG. 7, in other embodiments, such as when the underwater retrieval device receiving section 310 of the rewinding device 300 is V-shaped to retain the underwater retrieval device at an angle, the distance $D_2$ between an outer vertex of the housing 160 and the shaft coupler 128 is what determines the distance between the inner vertex of the underwater retrieval device receiving section 310 of the frame 302 and the shaft coupler 128.

Referring back to FIG. 14, the rotatable coupler 320 is coupled to the shaft coupler, such that when the rewinding device 300 is actuated, the actuating means 330 provides power to rotate the rotatable coupler 320, thus rotating the inner frame of the underwater retrieval device (such as cable reel 20, 120) within the outer frame of the underwater retrieval device (such as housing 60, 160). By providing an outer frame that does not rotate when rewinding with the rewinding device 300, the weight of the inner frame is supported by the outer frame when the inner frame is coupled to the rotatable coupler 320. For underwater retrieval devices that are used in deep water, such as underwater cables, deep water fishing traps or scientific equipment, etc., the long cable length can add a significant weight to the inner frame. Accordingly, when rotating the inner frame, little or no weight from the inner frame rests on the rotatable coupler 320, as this weight is supported by the outer frame of the underwater retrieval device.

In some embodiments, the rewinding device 300 can include a motorized rope guide 340 and a controller 350 configured to actuate and control the actuating means 330 and the rope guide 340. The motorized rope guide 340 moves laterally or horizontally along a rope guide endless screw 342 and rope guide rods 344 to facilitate the orderly rewinding of the inner frame. In some embodiments, the controller 350 can be configured to adjust the rope guide to move laterally at a speed of approximately 1 diameter of rope per 1 turn of the inner frame.

In some embodiments, the rewinding device 300 can include a tensioner system 360 that is configured to maintain a constant tension on the rope during rewinding. In some embodiments, the tensioner system 360 can be configured to provide a safety mechanism to stop the actuating means 330 when the tension exceeds a predetermined level of tension.

In some embodiments, the controller 350 can be configured to send an external signal to the underwater retrieval device to release the locking mechanism, for example via an acoustic modem and transducer. In some embodiments, the controller 350 can include a user interface, such as user interface 222, to allow a user to send the external signal to a controller on the underwater retrieval device. The user interface can also be used to allow the user to adjust the position of the rotatable coupler 320 and/or the frame 310. The user interface can also allow the user to program the diameter of the rope the rewinding device 300 is being used with so that the motorized rope guide 340 can be adjusted to move laterally at the proper speed with the rotation of the inner frame.

In some embodiments, the rewinding device 300 forms part of the boat unit 220 and/or the components of the boat unit 220 are integrated into the rewinding device 300. Accordingly, the controller 350 of the rewinding device 300 can be in bi-directional communication with the underwater retrieval device, for example to record pertinent operation data, such as a unique identification code, a GPS location of the launch point or the current location, the type of underwater instrument being deployed, and/or the time of the launch.

In some embodiments, the underwater retrieval device can include secondary sensors to monitor the underwater retrieval device and communicate information back to the rewinder device 300. The data can then be displayed to the user with the user interface.

Figure 15:
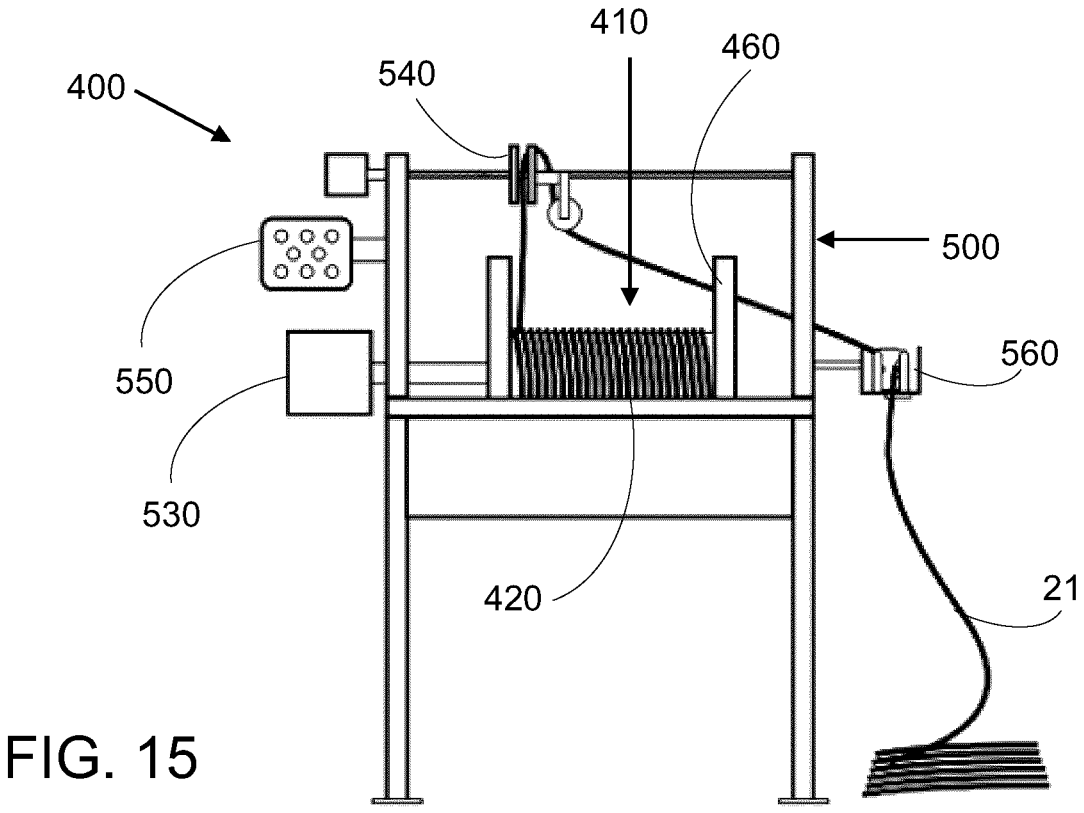
FIG. 15 is a front plan view of an underwater retrieval system according to one embodiment, showing an underwater retrieval device operatively coupled to a rewinder device.
Figure 16:
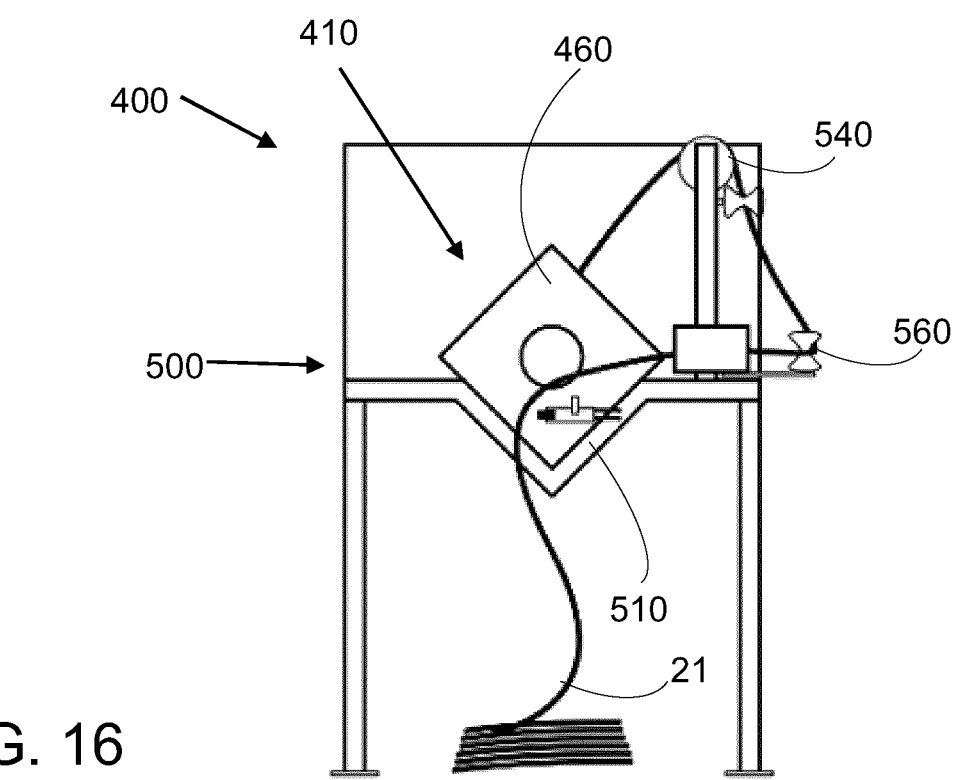
FIG. 16 is a side plan view of the underwater retrieval system shown in FIG. 15.

Referring now to FIGS. 15 and 16, an underwater retrieval system 400 is shown. The underwater retrieval system 400 includes an underwater retrieval device 410 and a rewinding device 500. The underwater retrieval device 410 includes an inner frame 420 rotatably coupled within an outer frame 460, a shaft coupler (not shown) on the inner frame 420, and an underwater controller (not shown). The rewinding device 500 includes a housing 510, a rotatable coupler (not shown), an actuating means 530, such as a motor, and a surface controller 550. As can be seen, the housing 510 of the rewinding device 500 is configured in a V-shape to receive and retain a vertex of the outer frame 460 of the underwater retrieval device 410.

During use of the underwater retrieval system 400, the underwater retrieval device 410 is deployed in the water in a closed configuration with an instrument. When the user is ready to retrieve the underwater instrument, the controller

550 on the rewinding device 500 sends an external signal to the underwater controller on the underwater retrieval device 410. In response to the external signal, the underwater controller places the underwater retrieval device 410 in an unlocked configuration, and a buoyancy means on the underwater retrieval device 410 allows the device to rise to the surface. The user can then retrieve the underwater retrieval device 410 from the water and place the device 410 in the frame 510 of the rewinder device. In some embodiments, a clamp (not shown) on the housing 410 can be adjusted horizontally to secure the underwater retrieval device 410 within the housing 410.

Once the rotatable coupler on the rewinding device 500 engages with the shaft coupler on the inner frame 420 of the underwater retrieval device 410, the surface controller 550 can then be used to activate the actuation means 530. The actuation means 530 rotates the inner frame 420 and winds the cable 21 around the inner frame 420. In some embodiments, the rewinding device 500 includes a rope guide 540 that is configured to move laterally to facilitate an orderly rewinding of the cable 21 around the inner frame 420. In some embodiments, the rewinding device 500 includes a tensioner 560 to maintain a constant tension on the cable 21 during rewinding.

Once the cable 21 is wound around the inner frame 420, the underwater retrieval device 410 can be placed back in the locked configuration and deployed underwater again with another instrument. Accordingly, the underwater retrieval system 400 provides a system that can be used and re-wound for subsequent use multiple times subsequent use without disassembly or replacement of parts. The underwater retrieval system 400 also allows the user to easily retrieve the underwater retrieval device 400 and simultaneously retrieve the underwater instrument and rewind the cable 21 around the inner frame 420 for subsequent use.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. An underwater retrieval system comprising:
   an underwater retrieval device comprising:
      an outer frame configured to be operatively connected to a buoyancy means;
      an inner frame rotatably mounted to the outer frame; and
      a shaft coupler accessible from an outside of the outer frame, the shaft coupler being configured to engage in rotation the inner frame within the outer frame; and a rewinding device comprising:
      a frame having an underwater retrieval device receiving section;
      a rotatable coupler configured to engage with the shaft coupler of the underwater retrieval device received in the underwater retrieval device receiving section of the frame; and
      an actuating means to rotate the rotatable coupler.

2. The underwater retrieval system of claim 1, wherein at least one of: the rotatable coupler and the frame is vertically translatable to adjust to a relative position of the rotatable coupler and the underwater retrieval device received in the underwater retrieval device receiving section of the frame.

3. The underwater retrieval system of claim 1, wherein the frame comprises a first end and a second end and at least one of the first end and the second end of the housing is horizontally translatable to adjust to a length of the underwater retrieval device receiving section of the frame to substantially correspond to a length of the outer frame.

4. The underwater retrieval system of claim 1, wherein the shaft coupler is accessible from an outer side of the outer frame to couple the rotatable coupler and the shaft coupler together.

5. The underwater retrieval system of claim 1, wherein the rewinding device further comprises a surface controller and the underwater retrieval device further comprises an underwater controller, wherein the surface controller is configured to send an external signal to the underwater controller.

6. The underwater retrieval system of claim 5, wherein the underwater controller is configured to send signals to the surface controller.

7. The underwater retrieval system of claim 1, wherein the underwater retrieval device further comprises a locking mechanism selectively configurable to prevent rotation of the inner frame with respect to the outer frame in a locked configuration and allow rotation of the inner frame with respect to the outer frame in an unlocked configuration.

8. The underwater retrieval system of claim 7, wherein the locking mechanism comprises a locking lever pivotally connected to the outer frame and biased away from the inner frame or the outer frame and a locking pin, wherein the locking pin is engaged with the inner frame in the locked configuration and disengaged from the inner frame when in the unlocked configuration.

9. The underwater retrieval system of claim 8, wherein the locking mechanism further comprises a biasing means to bias the locking lever away from the inner frame or the outer frame and the biasing means is coupled to the locking lever adjacent to or around the locking pin.

10. The underwater retrieval system of claim 1, wherein the underwater retrieval device further comprises at least one of a battery monitor, a water ingress monitor, a pressure sensor, or an inertial measurement unit.

11. An underwater retrieval device comprising:
   an outer frame configured to be operatively connected to a buoyancy means;
   an inner frame rotatably mounted inside the outer frame, the inner frame being configured to receive a cable disposed around an outside thereof;
   a locking mechanism selectively configurable in a locked configuration and an unlocked configuration, the locking mechanism comprising a locking lever pivotally connected to the outer frame and a locking pin, wherein the locking pin is engaged with the inner frame in the locked configuration of the locking mechanism and disengaged from the inner frame when in the unlocked configuration of the locking mechanism, the locking lever being biased away from the inner frame or the outer frame; and a controller including an external signal sensor and being operatively connected to the locking mechanism to selectively configure the locking mechanism in the unlocked configuration in response to an external signal received by the external signal sensor.

12. The underwater retrieval device of claim 11, wherein the locking mechanism further comprises a biasing means to bias the locking lever away from the inner frame or the outer frame, wherein the biasing means is coupled to the locking lever adjacent to or around the locking pin.

13. The underwater retrieval device of claim 11, wherein the locking pin is configured to break when a predetermined force is applied thereon.

14. The underwater retrieval device of claim 11, wherein the locking mechanism further comprises a lock comprising a first portion coupled to the locking lever and a second portion coupled to the outer frame, wherein the first portion and the second portion are releasably coupled together in the locked configuration.

15. The underwater retrieval device of claim 14, wherein the locking mechanism further comprises a release mechanism coupled to the lock and configured to receive an unlocking signal from the controller, wherein when the release mechanism receives the unlocking signal, the release mechanism uncouples the first portion and the second portion.

16. The underwater retrieval device of claim 15, further comprising a redundant release mechanism coupled at a first end to the locking lever and at a second end to the lock.

17. The underwater retrieval device of claim 11, further comprising the buoyancy means, wherein the buoyancy means is integrated in the outer frame.

18. The underwater retrieval device of claim 11, wherein the inner frame comprises a cable reel.

19. The underwater retrieval device of claim 11, wherein the controller is configured for bidirectional communication with a boat unit.

20. A method of retrieving an underwater instrument, the method comprising:

deploying the underwater instrument with an underwater retrieval device, the underwater retrieval device comprising:

a buoyancy means;

a cable reel operatively connected to the buoyancy means;

a locking mechanism configured to engage with the cable reel when in a locked configuration and disengage from the cable reel to move into an unlocked configuration, the locking mechanism comprising: a locking lever in a pivotal relationship with and biased away from the cable reel; and a locking pin, wherein the locking pin is engaged with the cable reel in the locked configuration and disengaged from the cable reel when in the unlocked configuration;

a release mechanism operatively connected to the locking mechanism; and a controller configured to receive an external signal from a boat unit, the controller being in data communication with the release mechanism and configured to send an unlocking signal to the release mechanism in response to the external signal, wherein the release mechanism is configured to disengage the locking mechanism from the cable reel when the unlocking signal is received from the controller;

sending the external signal to the controller via the boat unit; and retrieving the underwater instrument via the underwater retrieval device.

* * * * *